(12) United States Patent
McCarthy

(10) Patent No.: US 9,165,203 B2
(45) Date of Patent: Oct. 20, 2015

(54) LEGIBILITY ENHANCEMENT FOR A LOGO, TEXT OR OTHER REGION OF INTEREST IN VIDEO

(71) Applicant: General Instrument Corporation, Horsham, PA (US)

(72) Inventor: Sean T. McCarthy, San Francisco, CA (US)

(73) Assignee: ARRIS Technology, Inc., Suwanee, GA (US)

(*) Notice: Subject to any disclaimer, the term of this patent is extended or adjusted under 35 U.S.C. 154(b) by 58 days.

(21) Appl. No.: 13/975,839

(22) Filed: Aug. 26, 2013

(65) Prior Publication Data

US 2014/0270505 A1    Sep. 18, 2014

Related U.S. Application Data

(60) Provisional application No. 61/786,340, filed on Mar. 15, 2013.

(51) Int. Cl.
| | |
|---|---|
| *G06K 9/00* | (2006.01) |
| *G06K 9/32* | (2006.01) |
| *H04N 19/17* | (2014.01) |
| *H04N 19/46* | (2014.01) |
| *H04N 19/117* | (2014.01) |
| *H04N 19/154* | (2014.01) |

(Continued)

(52) U.S. Cl.
CPC ............ *G06K 9/3266* (2013.01); *H04N 19/117* (2014.11); *H04N 19/154* (2014.11); *H04N 19/167* (2014.11); *H04N 19/17* (2014.11); *H04N 19/46* (2014.11); *H04N 19/85* (2014.11); *G06K 2209/25* (2013.01)

(58) Field of Classification Search
None
See application file for complete search history.

(56) References Cited

U.S. PATENT DOCUMENTS

| | | | | |
|---|---|---|---|---|
| 5,799,113 | A * | 8/1998 | Lee | 382/256 |
| 6,057,938 | A * | 5/2000 | Abe et al. | 358/400 |
| 7,609,891 | B2 * | 10/2009 | Li | 382/190 |

(Continued)

FOREIGN PATENT DOCUMENTS

WO    2010/033642 A2    3/2010

OTHER PUBLICATIONS

PCT Search Report, Re: Application #PCT/US2014/022150; dated Sep. 22, 2014.

(Continued)

*Primary Examiner* — Bhavesh Mehta
*Assistant Examiner* — Feng Niu
(74) *Attorney, Agent, or Firm* — Thomas A. Ward

(57) ABSTRACT

A video processing system enhances quality of an overlay image, such as a logo, text, game scores, or other areas forming a region of interest (ROI) in a video stream. The system separately enhances the video quality of the ROI, particularly when screen size is reduced. The data enhancement can be accomplished at decoding with metadata provided with the video data for decoding so that the ROI that can be separately enhanced from the video. In improve legibility, the ROI enhancer can increase contrast, brightness, hue, saturation, and bit density of the ROI. The ROI enhancer can operate down to a pixel-by-pixel level. The ROI enhancer may use stored reference picture templates to enhance a current ROI based on a comparison. When the ROI includes text, a minimum reduction size for the ROI relative to the remaining video can be identified so that the ROI is not reduced below human perceptibility.

5 Claims, 17 Drawing Sheets

(51) Int. Cl.
*H04N 19/167* (2014.01)
*H04N 19/85* (2014.01)

(56) References Cited

U.S. PATENT DOCUMENTS

| | | | |
|---|---|---|---|
| 7,903,869 B2* | 3/2011 | Forutanpour | 382/162 |
| 8,243,117 B2* | 8/2012 | Ali et al. | 348/14.01 |
| 8,250,618 B2* | 8/2012 | Rosenzweig et al. | 725/96 |
| 2005/0175251 A1 | 8/2005 | Taketa et al. | |
| 2007/0097384 A1* | 5/2007 | Hashimoto | 358/1.2 |
| 2008/0069440 A1* | 3/2008 | Forutanpour | 382/163 |
| 2008/0084927 A1* | 4/2008 | Rosenzweig et al. | 375/240.02 |
| 2008/0205753 A1* | 8/2008 | Chen et al. | 382/165 |
| 2009/0169074 A1* | 7/2009 | Avinash et al. | 382/128 |
| 2010/0079575 A1* | 4/2010 | Ali et al. | 348/14.13 |
| 2010/0158099 A1* | 6/2010 | Kalva et al. | 375/240.01 |
| 2010/0172404 A1 | 7/2010 | Isnardi et al. | |
| 2010/0259676 A1 | 10/2010 | Swan | |
| 2014/0270504 A1 | 9/2014 | Baum et al. | |

OTHER PUBLICATIONS

N. Srinivasamurthy, et al., "Smart Codec Features in TMS320DM365", Application Report: SPRAB83—Dec. 2009, retrieved from URL<http://www.ti.com/lit/an/sprab83/sprab83.pdf> on Jun. 17, 2014.

* cited by examiner

LEGIBILITY ENHANCEMENT FOR A LOGO, TEXT OR OTHER REGION OF INTEREST IN VIDEO

CLAIM FOR PRIORITY

This application claims benefit of U.S. Provisional Patent Application No. 61/786,340, entitled "Legibility Enhancement for Video," by Sean McCarthy, filed Mar. 15, 2013, which application is hereby incorporated by reference herein.

BACKGROUND

1. Technical Field

The present invention generally relates to the field of video processing, and more particularly to improving the quality of images having blended graphics, such as where logos or text are provided as a region of interest (ROI) of the video.

2. Related Art

Video that once was only watched on living room televisions is now being rescaled and reformatted for consumption on smartphones, tablets, laptops, PCs, etc. There are now many form factors for display devices and more resolutions including adaptive bit rate (ABR) applications and ultra high definition televisions (UHDTV) available.

Broadcast television signals include image frames that can have overlaid graphics elements, such as text, logos, scores for sporting events or other graphics that form the ROIs. Coding and then decoding video for different formats can distort the ROI quality. The readability of ROIs are reduced when video content is rescaled for display on a small screen such a smartphone. Readability is also reduced when content is encoded at less than full resolution, such as commonly the case in ABR and over-the-top (OTT) applications. Current ABR and OTT encoders, transcoders, and stream processors process video in a manner that is sensitive to the overall human visual acuity, not to the text & symbol content in video.

In addition to distortion due to a change in video format, in some circumstances the ROI cannot be effectively separated from the background graphics resulting in distortion of the blended graphics when the video is encoded and decoded. For example, a broadcaster may overlay a company logo in the lower-right corner of program image frames to indicate that the program was received from their transmission facilities. If the ROI in the form of a logo is transparent, it can be difficult to visibly separate the ROI from the background, particularly when the screen size is reduced or altered. The data values can be a combination of text contributions from both the image and an overlaid ROI, making the separate text difficult to separate during video processing. To enable distortion to be reduced for combined images during the encoding and decoding process, accurate identification of the boundaries or edges of the graphics is desirable, particularly where the ROI is transparent or appears blended with the background.

It is desirable to provide techniques to prevent distortion and improve quality of the ROI during video processing, particularly when screen size is significantly reduced relative to what was intended for the original video.

SUMMARY

Embodiments of the present invention provide a system for improving the quality of a video that includes an overlay ROI, particularly when the screen size or form factor is changed during video processing. Embodiments of the invention enable service providers to make sure their brands and other text and graphics that form the ROI are legible. Embodiments of the current invention also provide a means for emergency and news information to be displayed effectively in ABR and OTT and small screen mobile environments.

For embodiments of the invention, boundaries of the ROI can be identified by maps or masks to enable quality enhancement of the ROI separate from the remaining video. The existence of an ROI and its boundaries can be identified prior to encoding or decoding. If the ROI is not previously identified steps can be taken to identify the ROI and its boundaries to enable enhancement of quality to be applied to the ROI.

To accomplish enhancement metadata is provided with the video data for processing so that the ROI that can be processed in a different manner than the remaining video to provide the ROI quality enhancement. Two main reasons for the reduced legibility after scaling of an ROI are: 1) a shift in spatial frequency information into a range beyond human visual acuity; and 2) the reduction in local contrast caused by the rescaling. Visual acuity is a function of both spatial frequency and local contrast. Thus, embodiments the present invention provide an ROI enhancer to improve legibility for the ROI during decoding to compensate to some extent for both the shift in spatial frequency and for the loss of local contrast introduced by rescaling.

In improving legibility, the ROI enhancer selectively increases any or several of contrast, brightness, hue, saturation, and bit density of the ROI. The ROI enhancer can work on groups of pixels or on a pixel-by-pixel basis. The ROI enhancer may optionally use stored reference pictures to measure persistence of text and logos, and enhance the current ROI based on a comparison. The ROI enhancer can use further techniques to improve legibility. For example, a median filter can be used with the decoder to accentuate primarily the edges of the ROI. Further, the ROI can be converted to black and white during decoding when alpha blended values of the ROI fall below a certain value to enable quality enhancement by more efficient video compression. Further, posterizing of the colors for the ROI pixels can be performed during decoding so that less color choices are available to enable more efficient video compression.

In another embodiment, when the ROI includes text with letters or numbers, a minimum reduction size of the text to be reduced is identified to enable a viewer to read the text. For scaling, the boundary of the ROI text is provided along with the minimum size reduction as metadata to the decoder, since during decoding the screen size may be reduced too low below the original size intended for human viewing. The decoder when reducing the screen size of the original video to fit a smaller screen then decodes the video so that the ROI is separately reduced in size to the minimum amount when the remaining video is reduced to a size below the minimum screen size for the ROI.

As indicated above, the ROI enhancement technique in some embodiments includes an algorithm to identify the ROI and its boundary. In one embodiment, a method of detection of an ROI overlay in an image is performed by initially defining first and second pixel areas within the image. An alpha-blended value is then calculated for the mean color value of the second area with an overlay color value. Then, if the mean color value of the first area is closer to the alpha-blended value than it is to the mean color value of the second area, the following steps are performed: (1) an overlay area is defined comprising at least one pixel within the first area to be part of a ROI; and (2) a mask or boundary is identified for the ROI in the region of the first area. Procedures according to embodiments of the present invention can then be applied to improve the quality of the overlay area, which is defined as the ROI.

BRIEF DESCRIPTION OF THE DRAWINGS

Further details of the present invention are explained with the help of the attached drawings in which.

DETAILED DESCRIPTION

I. Overview

A ROI or its boundaries can already be identified prior to encoding, or in some cases the ROI boundaries must be detected. Once the ROI itself is identified, enhancement techniques of embodiments of the present invention are applied to the ROI to enhance quality. The following description will first review techniques applied according to embodiments of the present invention to enhance the quality of video in a ROI. The description will then describe techniques that can be applied to identify the ROI and its boundaries. Although several techniques are described to determine if the ROI exists and identify its boundaries, it is understood that other techniques may be used to identify the ROI.

II. Enhancing the ROI

A. ROI Enhancing System

Figure 1A:
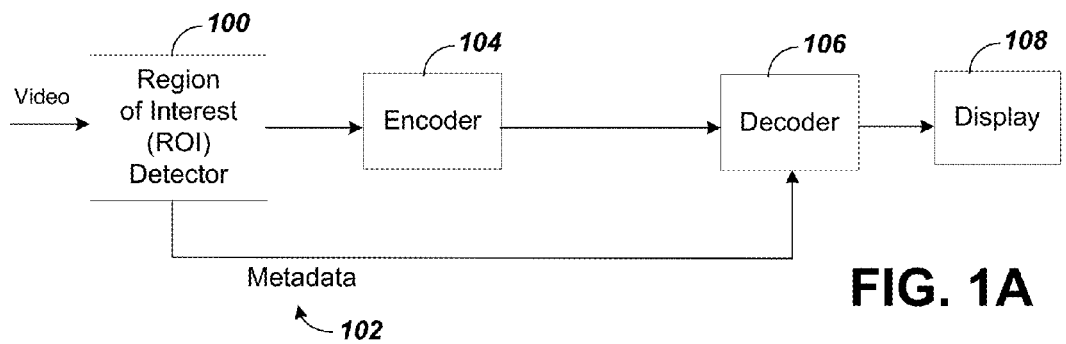
FIGS. 1A-1C depicts a block diagrams of video processing systems that enable detection and enhancement of a ROI.
Figure 1B:
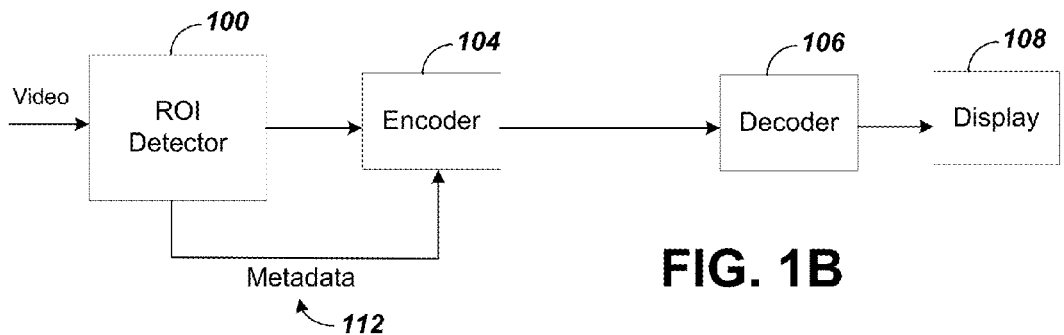
Figure 1C:
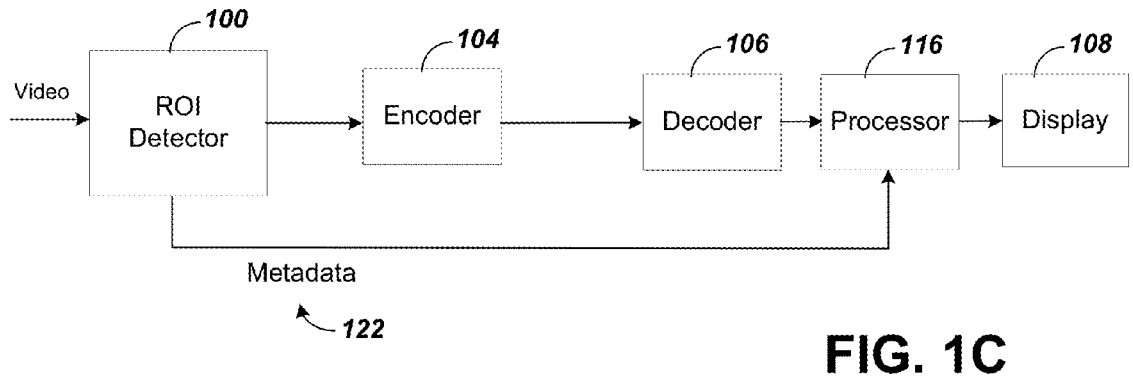

FIGS. 1A-1C depict a block diagram of video processing systems that can be used with embodiments of the present invention to enable detection and enhancement of a ROI. In FIG. 1A, a ROI detector 100 receives a video and determines if a ROI overlay area is present. The ROI detector 100 detects the ROI using algorithms, such as described subsequently. The ROI detector 100 can also receive information with the video that indicates the ROI is present. In either case, the ROI detector 100 provides metadata 102 indicating that the ROI is present and in some cases data about boundary regions of the ROI or other information about the ROI as an output. The ROI detector 100 also passes the video data as an output to an encoder 104. The encoder 104 encodes the data and provides it for transmission to decoder 106. The ROI detector 100 of FIG. 1A provides the metadata 102 to the decoder 106 to enable the decoder 106 to identify and enhance the ROI separate from the remaining video. Providing the metadata 102 to the decoder 106 allows simplifying encoding and greater data compression to be provided by encoder 104, while still allowing enhanced data quality for the ROI to be provided from the decoder 106 to display 108.

FIG. 1B illustrates that the metadata of the system of FIG. 1A can be provided directly to the encoder 104 as metadata 112 that can be used to enhance the ROI at encoding. Although the metadata 102 of FIG. 1A is provided directly to the decoder 106 to allow for higher compression during encoding, FIG. 1B illustrates that embodiments of the present invention contemplate also enhancing an ROI at the encoder. As can be seen from FIG. 1B, components carried over from FIG. 1A are similarly labeled, as will be components carried over into subsequent drawings.

FIG. 1C illustrates that the system of FIG. 1A or FIG. 1B can be modified to include a processor 116 to receive metadata 122 for enhancing a ROI. The system of FIG. 1C shows that although a conventional decoder 106 can be used that is not reprogrammable to include the ROI enhancement feature, the separate processor 116 can be provided that can provide such ROI enhancement. Although the processor 116 is shown following the decoder 106, it is understood that processor 116 could be provided at other points in the system.

B. Quality Enhancing Techniques

Figure 2A:
FIGS. 2A-2B show a frame of a video displayed first in FIG. 2A for a large screen size and second in FIG. 2B for a reduced screen size.
Figure 2B:

FIGS. 2A-2B show a frame of a video illustrating the effect of screen size reduction from an initial video display size. FIG. 2A shows the frame of the video as provided in an original display size. FIG. 2B shows the same frame reduced in size to fit a smaller screen. An example of the reduction can be from a large screen television down to a cell phone screen. As shown, the text is much more difficult to view with the screen size in FIG. 2B than FIG. 2A.

Figure 3:
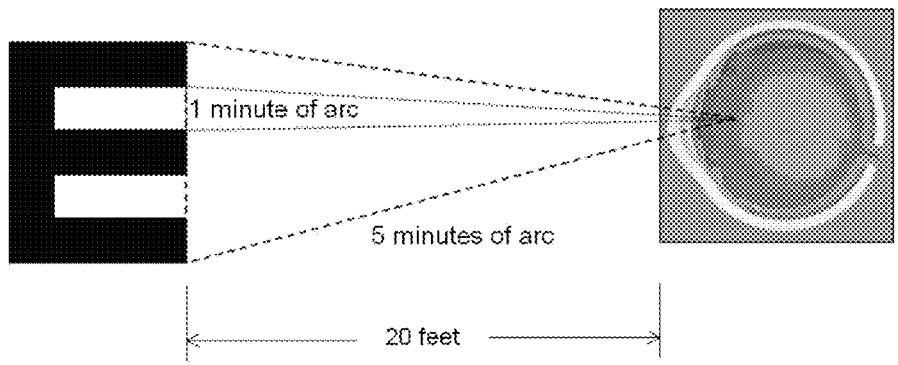
FIG. 3 illustrates the Snellen factor for the spacing between text elements for which a screen size can be reduced and the text still can be visible.

FIG. 3 illustrates the Snellen acuity effect that identifies the limits of human visibility of text when screen size is reduced. Under the Snellen acuity effect, a person with 20/20 vision can resolve 1 minute of arc at 20 feet. In FIG. 3, one minute of arc is illustrated from an eye to a spacing in a letter "E". The illustration of FIG. 3 also illustrates 5 minutes of arc from the top to the bottom of the letter "E". Original letters or numbers must have gaps with at least n minutes of arc to be legible after 1/n down sampling.

Figure 4:
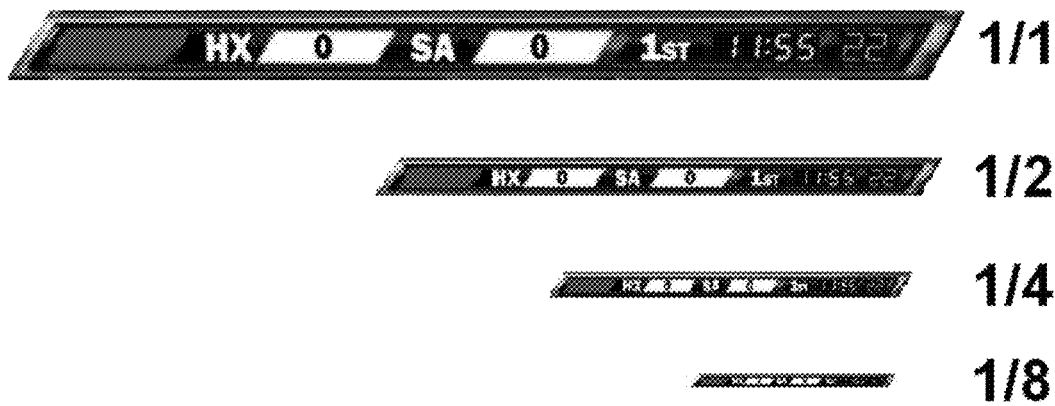
FIG. 4 shows four different text sizes from the scores of FIGS. 2A and 2B to illustrate the Snellen acuity effect.

FIG. 4 shows four different text sizes from the scoreboard of FIGS. 2A and 2B to illustrate the Snellen acuity effect. The four different sizes include the original text size of 1/1 along with ½, ¼ and ⅛ of the original size. For the letters, such as the letter "A" in the score, the arc is approximately n=4. Thus, the letters are visible down to the ¼ level, but not down to the ⅛ level.

For some embodiments of the present invention to utilize the Snellen acuity effect, the ROI boundary of the text is thus provided along with a letter gap size "n" in metadata. Since original letters or numbers must have gaps of at least n minutes of arc to be legible after 1/n down sampling, in some embodiments of the present invention when the screen size of the original video is reduced to fit a smaller screen, the ROI is separately held to a reduction size no smaller than needed to allow letter or number gaps with n minutes of arc to be reduced no more than to 1/n of the original size. The remaining video can still be reduced relative to the larger ROI. In alternative embodiments, the system does not allow the screen size to be reduced for the entire video including the ROI below the 1/n level. In further embodiments, the ROI has a set reduction amount that is provided in the metadata that is not directly related to a Snellen acuity number, while the remaining video continues to be reduced in size beyond the ROI sizing.

Figure 5:
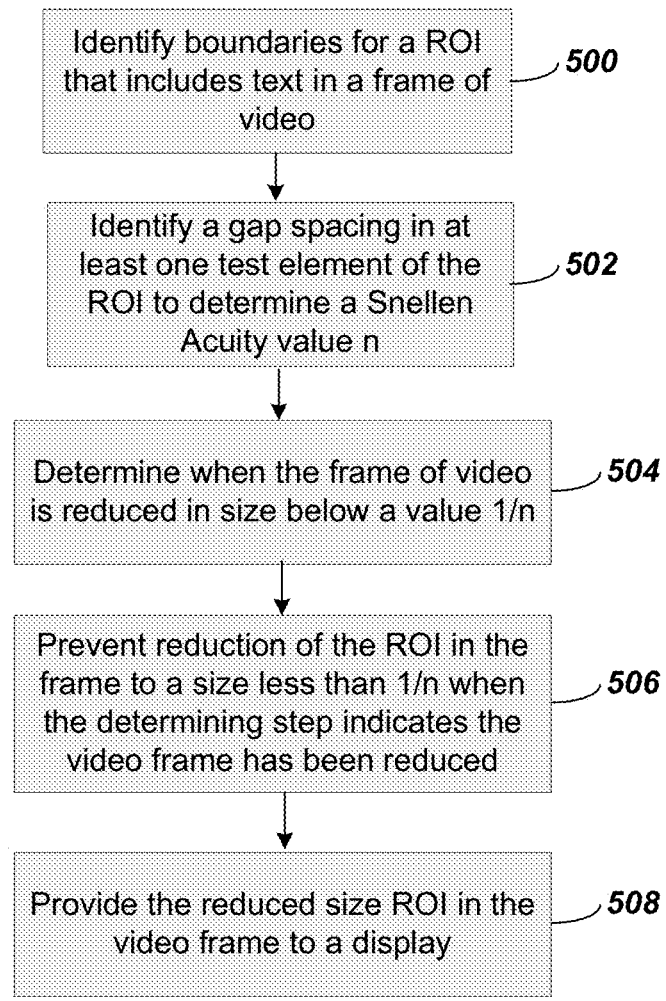
FIG. 5 shows a flow chart illustrating a process for enhancing a ROI by limiting the ROI reduction size when screen size is reduced.

FIG. 5 shows a flow chart illustrating a process for enhancing a ROI by limiting the ROI reduction size when screen size is reduced. In a first step 500 the ROI is identified. The ROI can be identified using methods described subsequently, or it can be identified in data provided with the video. The ROI can further be identified from stored templates for the ROI or from other stored reference pictures. The ROI can be text, a logo, graphics, or a ticker or scrawl feed, and the first step 500 can detect the boundaries of the ROI as well as the text or other features within the ROI. In step 502, if the Snellen acuity affect is used to impose limits on screen sizing, the gap spacing in at least one letter of the ROI is identified. This will enable determination of a value n minutes of arc of spacing in text. In step 504, a metadata indication can be inserted indicating that data quality enhancement procedures are available if later downsizing occurs. Step 506 provides enhancement features if sizing is changed to limit the size reduction of the ROI. Specifically in step 506, the method prevents reduction of the ROI in the frame to less than a 1/n size reduction when the overall frame size is reduced below a 1/n size. As an alternative to step 506 when the Snellen acuity value is not determined, the creator of the ROI can include information for metadata that limits the size that the ROI can be reduced relative to the remaining picture to enable viewability. Finally in step 508 the video with the reduced size ROI is provided to a display. Note that as described previously with respect to FIGS. 1A-1C, the actual sizing of the video ROI can occur at decoding or earlier.

Figure 6:
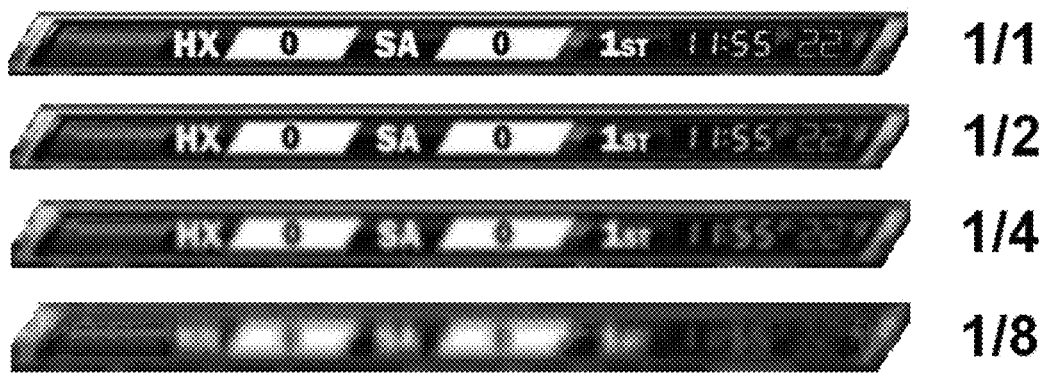
FIG. 6 illustrates that when picture size is reduced, the quality of the picture in the video screen can also be degraded.

FIG. 6 illustrates that when picture size is reduced, the quality of the picture in the video screen can also be reduced. FIG. 6 shows four different sizes including the original text size of 1/1 of FIG. 2A along with ½, ¼ and ⅛ sizes, but with the reduced size text remaining as large as the 1/1 text to illustrate the degradation in quality resulting from the reduction in screen size.

Figure 7:
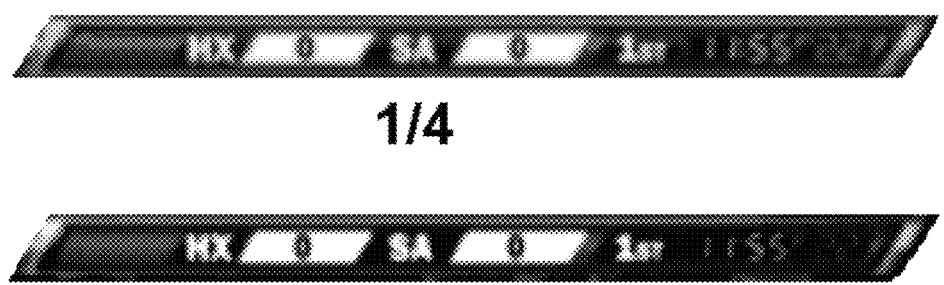
FIG. 7 illustrates the original ¼ size text of FIG. 5 along with the same text having quality enhancements applied according to an embodiment of the present invention.

Due to the reduction in quality, in some embodiments of the present invention to improve legibility, an ROI enhancer is provided to selectively increase any or several of contrast, brightness, hue, saturation, and bit density of the ROI. The ROI enhancer can work on groups of pixels or on a pixel-by-pixel basis. The ROI enhancer may optionally use stored reference pictures to measure persistence of text and logos, and enhance the current ROI based on a comparison. The ROI enhancer may similarly use previously stored templates of text or logos that can be obtained from an external database or generated from previous video. The ROI Enhancer can further use externally supplied parameters to control the strength and temporal responses of the adjustments. FIG. 7 illustrates the original ¼ size text of FIG. 6 along with the same text having quality enhancements applied according to an embodiment of the present invention.

The ROI enhancer can use particular techniques to improve legibility. For example, a median filter can be used with the decoder to accentuate primarily the edges of the ROI. Further, the ROI can be converted to black and white during decoding when alpha blended values of the ROI fall below a certain value to enable quality enhancement by more efficient video compression. Further, posterizing of the colors for the ROI pixels can be performed during decoding so that less color choices are available to enable more efficient video compression.

Figure 8:
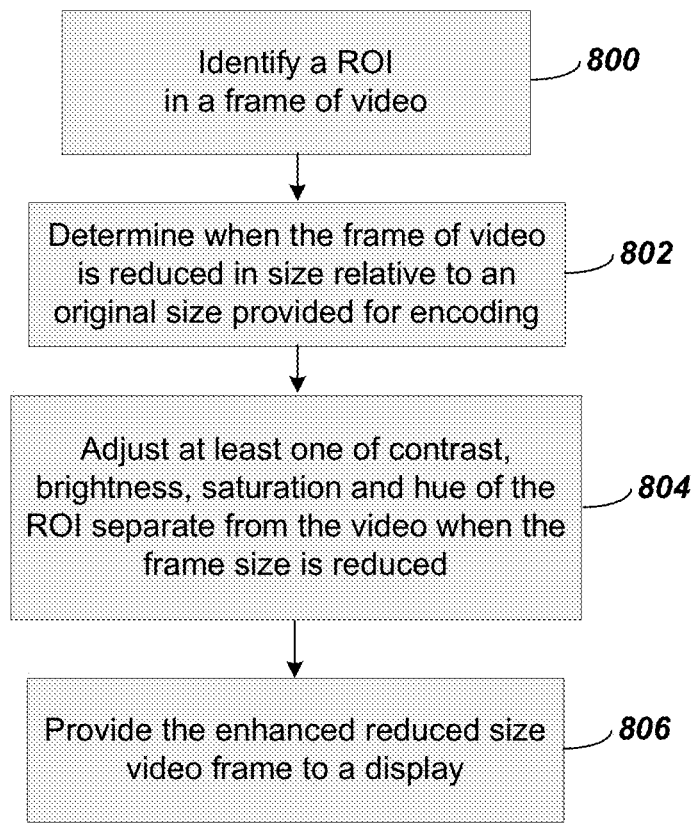
FIG. 8 shows a flow chart illustrating a process for enhancing the quality of a ROI separate from the remaining picture.

FIG. 8 shows a flow chart illustrating a process for enhancing the quality of a ROI. In step 800, the ROI is identified similar to step 500 described above with respect to FIG. 5. Next in step 802, a determination is made when the frame of the video containing the ROI will be reduced in size relative to an original size provided for encoding. This information can be determined at decoding or earlier, as described with respect to FIG. 5, with metadata provided to enable video quality enhancement features used at the time of size reduction. Next in step 804, when it is determined that video size is reduced, at least one of contrast, brightness, saturation and hue of the ROI separate from the video is enhanced separate from the video. Finally, in step 806 the enhanced ROI with the video is provided for display. Note that step 804 can be added to the process of step 506 of FIG. 5 to both prevent reduction of the ROI size relative to the rest of the video and enhance the video quality together.

Since the ROI boundary and information for enhancing quality is provided with metadata for decoding, in some embodiments further metadata information can be provided. For example, if the ROI is a logo, the local station identifier could be made available. Further, for interactive screen displays, a selection menu can be provided with the logo so that a programming guide showing subsequent shows on the network can be displayed when touching or clicking the logo. If the ROI provides game scores, the metadata can include a selection menu with scores of other games being played during at the same time, individual player statistics, or a news feed with other sporting information and scores.

III. Identifying a ROI and its Boundaries

As indicated previously, the ROI enhancement technique in some embodiments includes an algorithm to identify the ROI and its boundaries. Techniques that can be employed to detect ROIs and determine their boundaries are described in U.S. patent application Ser. No. 13/862,318 (hereafter, the '318 Application) entitled "Logo Presence Detection Based on Blending Characteristics" filed Apr. 12, 2013, having docket number CS41103, which is incorporated herein by reference in its entirety. The '318 application provides a method of detection of an overlay in an image by initially defining first and second pixel areas within the image. Next an alpha-blended value is calculated for the mean color value of the second area with an overlay color value. Then, if the mean color value of the first area is closer to the alpha-blended value than it is to the mean color value of the second area, then the following steps are performed: (1) an overlay area is defined comprising at least one pixel within the first area to be part of a ROI; and (2) a mask or boundary is identified for the ROI in the region of the first area. Procedures according to embodiments of the present invention can then be applied to improve the quality of the overlay area, which is defined as the ROI.

Details of methods to detect an ROI and its boundaries from the '318 Application are described in detail to follow.

Figure 9:
FIG. 9 depicts an example image with a logo for a ROI providing blended graphics.

To illustrate how an ROI is identified, reference is first made to FIG. 9 which depicts a logo 912 as an overlay-blended graphics in an image. The logo 912 illustrates that other overlays can constitute an ROI that can be enhanced according to embodiments of the present invention in addition to ROIs such as the sports score of FIG. 1A. The logo 912 and a graphic providing program identification 911 are visible within the image of FIG. 9. Notably, both the rights logo 912 and the program identification element 911 exhibit an attribute of transparency. That is, some features of a first image corresponding to program material are at least partially visible through the graphic elements 911 and 912.

Figure 10:
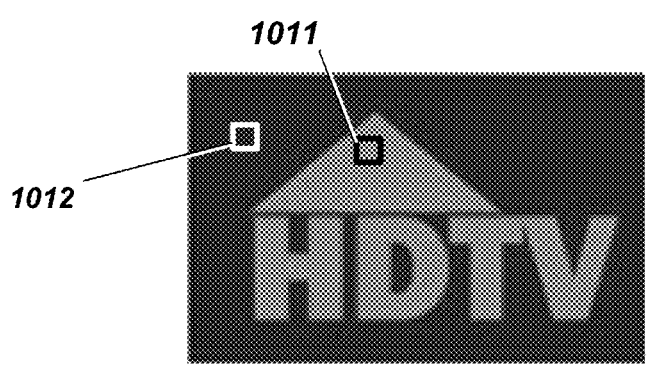
FIG. 10 depicts pixel regions in an ROI of FIG. 9.

FIG. 10 shows the logo in the ROI of FIG. 9, as broken down into smaller pixel areas. Region 1011 indicates a small region within the shape of the recognizable logo. Region 1012 indicates a small region that is near to the logo, but is not within the logo.

$$P(i,j) = (1-\alpha)P_b(i,j) + \alpha P_l(i,j) \qquad \text{Eqn. 1}$$

The value of an image pixel within an overlay-blended graphic can be modeled according to Eqn. 1. $P(i,j)$ represents the value of an overlay-blended pixel, such as that shown by 1011, at a location $(i,j)$ within an image frame. The location $(i,j)$ can represent the $i^{th}$ row and $j^{th}$ column of a two-dimensional array of pixel locations.

Pixel values as described herein can correspond to a luminance component value as is well known in the related arts. Use of the luminance component alone is sufficient for the purpose of logo presence/absence determination in many applications, and results in reduced computational complexity as compared to using multiple components, such as RGB (i.e., red, green, and blue), for the pixel value. In some embodiments a typical range for such luminance values can range from 0 to 1, corresponding respectively to a specified minimum luminance measure and a specified maximum luminance measure. A minimum to maximum range can respectively correspond to values coded as 0 to 255, which can advantageously correspond to 8-bit coding of the values.

The overlay-blended pixel value P is a blend of contributions from a logo pixel value $P_l$, and a background pixel value $P_b$, according to the value of the blending parameter $\alpha$. The blending parameter can also be referred to as an overlay-blending parameter, since it relates to overlaying a graphic onto an image. In some typical embodiments, each of $P_l$, $P_b$, $\alpha$ can have a range of 0 to 1. The logo pixel value $P_l$ is representative of an imposed graphic element such as a logo, and the background pixel value $P_b$ is representative of a first image upon which the graphic is imposed.

Embodiments of elements of the present invention to detect an ROI can analyze an image to determine if portions of the image have characteristics that are consistent with the presence of an overlay-blended graphic object. The analysis is based on the properties of the model of Eqn. 1. As $P_b(i,j)$ is not accessible in the already-combined image, some embodiments of the invention provide an approximation by using a spatially separate pixel from the image that is preferably nearby, such as indicated in Eqn. 2.

$$\hat{P}_b(i,j) = P(i',j') \qquad \text{Eqn. 2}$$

For equation 2, FIG. 10 provides an example with an overlay-blended logo that is referenced for description. In an example, the logo of FIG. 10 with nearly-maximum luminance value (prior to blending) was overlay-blended on a dark image, resulting in an overlay-blended logo that is much darker than the maximum luminance value (luminance much less than maximum). For the overlay-blended pixel $P(i,j)$ in the region 1011 within the logo, $P_b(i,j)$ can be approximated by a nearby pixel in the Region 212, $(i',j')$ located outside the logo. Under this approximation, $P_b(i,j)$ becomes $\hat{P}_b(i,j)=P(i',j')$, and the model of Eqn. 1 becomes:

$$P(i,j) \approx \hat{P}(i,j) = (1-\alpha)\hat{P}_b(i,j) + \alpha P_l(i,j) \qquad \text{Eqn. 3}$$

Assuming that $P_l(i,j)$ and $\alpha$ are known, Eqn. 3 can be evaluated. In some cases, $P_l(i,j)$ and $\alpha$ may not be directly known. However, it has been observed that several broadcasts use approximately maximum luminance (e.g., 255 for an 8-bit representation) for $P_l(i,j)$ and often use an $\alpha$ in the range of 0.3-0.5. Thus, when and $P_l(i,j)$ and $\alpha$ are not known, it is possible to use approximate values such as $P_l(i,j)$="maximum-value" and $\alpha=0.4$. Alternatively, sample images from a broadcast containing an overlay-blended logo can be captured and the logo region of the images can be further analyzed to provide estimates of $P_l(i,j)$ and $\alpha$.

An overlay-blended graphic (e.g., an overlaid logo) presence criterion can be satisfied if the value of $P(i,j)$ is a better match to the value of $\hat{P}(i,j)$ than it is to the value of $\hat{P}_b(i,j)$. That is, an overlay-blended graphic presence is indicated at position $(i,j)$ if $P(i,j)$ is in a sense closer to the value of $\hat{P}(i,j)$ than it is to the value of $\hat{P}_b(i,j)$.

A overlay-blended graphic presence indicator $C_p$ can represent the result of evaluating the criterion. In some embodiments, the logo presence criterion can be evaluated as the logic equation:

$$C_p = \text{If } (|\hat{P}(i,j) - P(i,j)| < |P(i,j) - \hat{P}_b(i,j)|) \qquad \text{Eqn. 4}$$

In some embodiments, the satisfaction of an overlay-blended graphic presence criterion can be subject to an additional tolerance constraint. The further constraint can be expressed as:

$$\hat{P}(i,j) < (1-\alpha)\hat{P}_b(i,j) + \alpha P_l(i,j) + \text{tolerance}(\hat{P}_b)$$

$$P(i,j) - [(1-\alpha)\hat{P}_b(i,j) + \alpha P_l(i,j)] < \text{tolerance}(\hat{P}_b) \qquad \text{Eqn. 5a}$$

When this additional constraint is used, both Eqn. 5a and the If statement of Eqn. 4 must evaluate as "true" (which in some embodiments can be represented as a numerical value of 1) for the overlay-blended graphic presence criterion $C_p$ to indicate a positive (e.g., "true" or 1) output. This additional constraint helps prevent a false-positive indication when the pixel at position $(i,j)$ is not overlay-blended, but has a very high luminance value as compared to the pixel at position $(i',j')$. The additional constraint can alternatively be formulated with an absolute-value operation as shown in Eqn. 5b to reduce false-positive responses due to both too-high and too-low luminance values that nevertheless satisfied Eqn. 4. Excluding otherwise positive results based on failing to meet a constraint can also be referred to as redefining an overlay area.

$$|P(i,j) - [(1-\alpha)\hat{P}_b(i,j) + \alpha P_l(i,j)]| < \text{tolerance}(\hat{P}_b) \qquad \text{Eqn. 5b}$$

In such embodiments, satisfaction of the overlay-blended graphic presence criterion requires that the value of $P(i,j)$ is a better match to the value of $\hat{P}(i,j)$ than it is to the value of $\hat{P}_b(i,j)$, and, that the applicable Eqn. 5a or 5b evaluates as true.

The value of tolerance($P_b$) can be fixed or variable. A fixed value is very simple to implement, but better performance may be obtained with a variable value. When using a variable value, it is preferable that the value of tolerance($P_b$) decreases as the value of $\hat{P}_b$ increases. This because a blended-overlay causes a proportionally smaller increase in luminance when the background pixel already has a high luminance value. Some embodiments use a linear function for $\hat{P}_b$ tolerance($P_b$), which can vary linearly from its maximum value to its minimum value as $\hat{P}_b$ increases from a minimum value in its range to a maximum value in its operating range. Considering a case where the luminance is represented in a range from 0 to 255, in some embodiments the maximum value of tolerance($\hat{P}_b$) is 30 and its minimum value is 6. In some embodiments, a minimum value of $\hat{P}_b$ can correspond to black, and, a maximum value can correspond to white.

In some embodiments, this additional constraint upon the overlay-blended graphic presence criterion can advantageously prevent false-positive detection from a non-blended bright object.

Some additional non-limiting examples of introducing a tolerance value, tolerance($\hat{P}_b$), are as follows:

$$P(i,j)<(1-\alpha)\hat{P}_b(i,j)+\alpha P_l(i,j)+\text{tolerance}(\hat{P}_b) \quad \text{Equation 5c}$$

$$P(i,j)>(1-\alpha)\hat{P}_b(i,j)+\alpha P_l(i,j)-\text{tolerance}(\hat{P}_b) \quad \text{Equation 5d}$$

By way of non-limiting examples:
If P(i,j) is closer to $(1-\alpha)\hat{P}_b(i,j)+\alpha P_l(i,j)$, then the detector output can be 1 as long as:

$$P(i,j)<(1-\alpha)\hat{P}_b(i,j)+\alpha P_l(i,j)+\text{tolerance}(\hat{P}_b)$$

Example: tolerance($\hat{P}_b$) varies linearly from 30 to 6 as $\hat{P}_b$ increases from 0 (black) to 255 (white)

Additionally by way of non-limiting example, to reduce the likelihood of a false positive result the following can be employed.

If P(i,j) is closer to $(1-\alpha)\hat{P}_b(i,j)+\alpha P_l(i,j)$, then the detector output will be 1 as long as:

$$P(i,j)>(1-\alpha)\hat{P}_b(i,j)+\alpha P_l(i,j)-\text{tolerance}(\hat{P}_b)$$

Example: tolerance($\hat{P}_b$) varies linearly from 30 to 6 as $\hat{P}_b$ increases from 0 (black) to 255 (white)

Additionally in some embodiments both upper and lower boundaries can be combined, as shown below:
If P(i,j) is closer to $(1-\alpha)\hat{P}_b(i,j)+\alpha P_l(i,j)$, then the detector output will be 1 as long as:

$$P(i,j)<(1-\alpha)\hat{P}_b(i,j)+\alpha P_l(i,j)+\text{tolerance}(\hat{P}_b); \text{ AND}$$

$$P(i,j)>(1-\alpha)\hat{P}_b(i,j)+\alpha P_l(i,j)-\text{tolerance}(\hat{P}_b)$$

Figure 11:
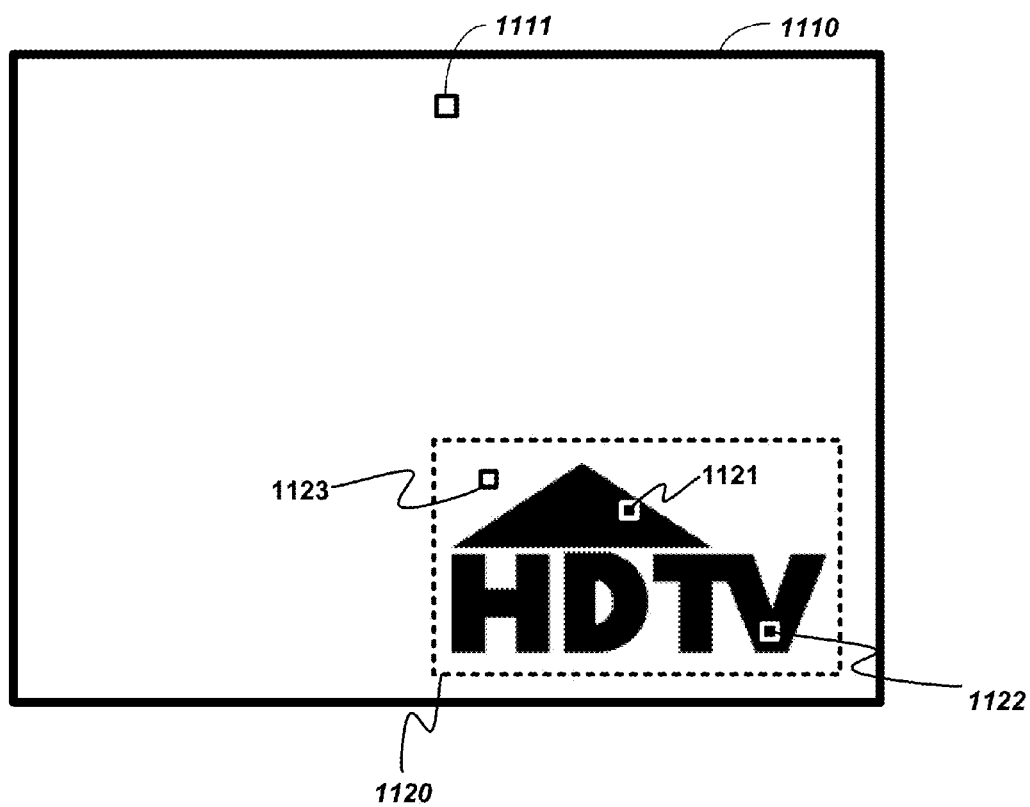
FIG. 11 depicts regions in a frame with a ROI, the image having blended graphics.

FIG. 11 depicts regions in a frame with a ROI, the image having blended graphics FIG. 11 does not show the actual pixel values of the image, but rather only serves as a logical reference for the different regions of the image. For convenience in this representation, locations where logo pixels were overlay-blended onto the image correspond to black shown within the frame, and all other locations within the frame correspond to white.

A cutout region 1120 is also shown within the frame of FIG. 11. The cutout region 1120 contains a recognizable logo, with regions 1121 and 1122 corresponding to locations with logo presence. Region 1123 is located within the cutout, but outside the shape of the logo, thus corresponding to a location with logo absence. Notably, as shown in the example, an overlay-blended graphic can have a complex geometry and/or combination of shapes such that overlay-blended graphic presence and absence do not necessarily correspond to connected and/or contiguous regions within the combined image. A set of information specifying the shape and location of a graphic element, such as a logo, can be referred to as a logo mask.

In operation, downstream processes can be optimized, based on the identification of the presence of a particular proprietary rights logo at a specific location within specific images. For example, an encoder of an image stream can adjust encoding parameters, such as bit rate, in response to per-pixel or per-area indications of the presence of a specified proprietary logo. Such bit-rate adjustments can optimize the downstream viewing characteristics of the logo. Additionally in some embodiments, the absence of a proprietary rights logo, on a per-frame basis, can help identify a commercial break inserted into a program stream or the presence of specific logos within a frame can help to identify specific programs and/or channels.

FIG. 11 also shows a binary image with a logo mask. The logo mask is represented by the black pixels of the "H"-"D"-"T"-"V" block letters and the pixels of the black-filled triangle above the letters. For convenience of display in FIG. 11, the pixels having value 1 (the logo mask) were mapped to a display color of black and the pixels having a value of 0 were mapped to a display color of white. In some embodiments, the logo mask pixels may be represented in a non-binary form, such as by the maximum luminance value or a predetermined luminance value such as $P_l$. An embodiment can make a determination as to whether or not the corresponding overlay-blended logo has been imposed on the image being analyzed. Candidate locations (i',j') for evaluating the background pixel value $\hat{P}_b$ can be any pixel locations that are specified to be outside of the logo mask. A candidate location (i,j) for both measuring an image pixel value P, and estimating an overlay-blended pixel value $\tilde{P}$, can be any location that is specified to be inside the logo mask. It can be advantageous to select the (i',j') location to be close to but outside the logo mask. It can be further advantageous to invoke spatial averaging techniques in evaluating the background pixel value and/or the image pixel value.

Thus, steps of a method of practicing this embodiment, for each image frame of interest, can comprise:
  measuring an average pixel intensity for at least a portion of the pixels located inside the logo mask, thereby providing an image pixel value P;
  measuring an average pixel intensity for at least a portion of the pixels located outside the logo mask, thereby providing a background pixel value $\hat{P}_b$;
  estimating an overlay-blended pixel value $\overline{P}$, which can be according to Eqn. 3; and,
  evaluating the overlay-blended graphic presence criterion, using these P, $\hat{P}_b$, and $\hat{P}$.

The overlay-blended graphic presence criterion can be evaluated according to Eqn. 4, in some such embodiments. In some embodiments using a logo mask, a determination of whether the logo represented by the logo mask is present in the image being analyzed, is based on whether the overlay-blended graphic presence criterion is satisfied or not.

Case 1: Embodiment with a Predefined Logo Mask Available

Figure 12A:
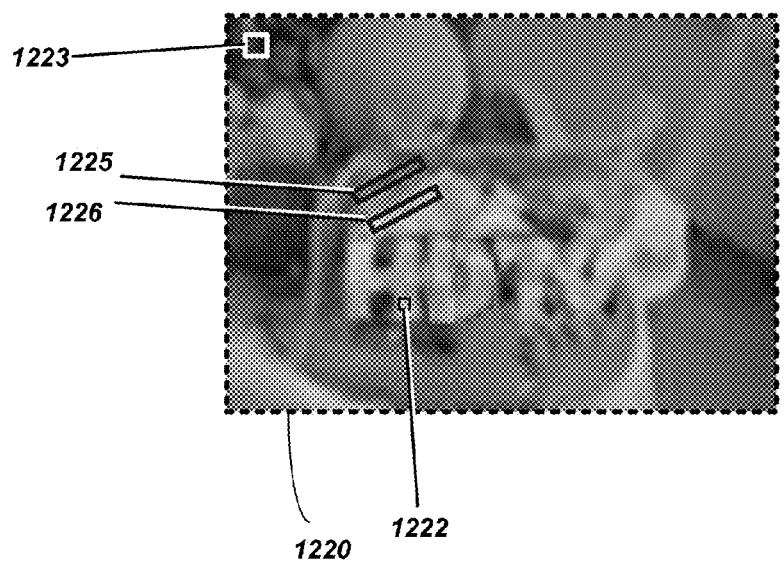
FIG. 12a-12b depict regions of images with a predefined logo mask as a ROI.
Figure 12B:
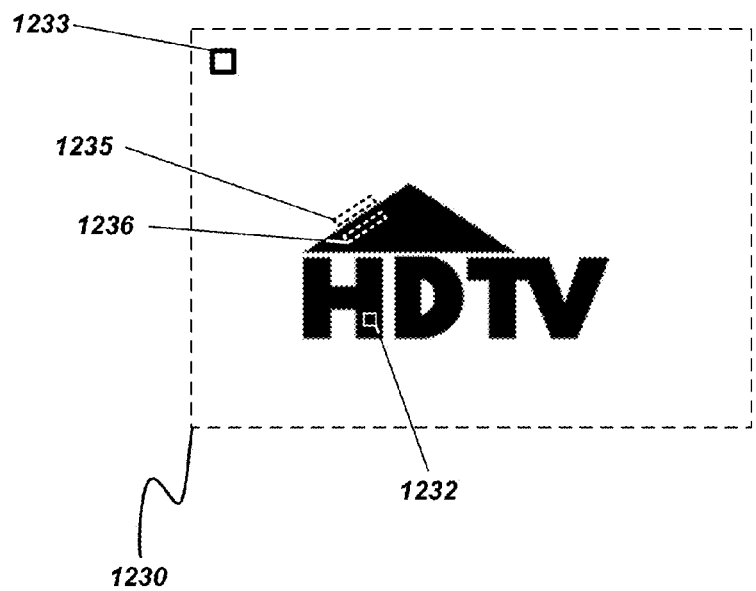

The diagrams of FIGS. 12a-12b depict Case 1 embodiments. In Case 1 embodiments, a logo mask is available. The logo mask specifies the location of pixels inside a logo. In an example embodiment, a logo mask represents the set of (i,j) locations at which corresponding logo pixels may be present, within a combined image. That is, the locations of the logo pixels within a frame are predetermined. In some embodiments, a logo mask can be represented as a portion of a binary image, the binary image having the same dimensions as the image (or image cutout) being analyzed, where the binary image has pixel values of 1 at all positions where the logo pixels may be present (the logo mask), and 0 at all other pixel locations (outside the logo mask).

In FIG. 12a, the region illustrates a cutout region of an example combined video image frame. The region of FIG. 12b represents a cutout region 1230 of a combined image frame such as the image frame 1110 depicted in diagram of FIG. 11, assuming that the case depicted in FIG. 11 is a case in which a logo mask is available. For convenience in FIG.

12b, maximum luminance values can correspond to black shown within a region, and minimum luminance values can correspond to white shown within a region.

Case 1: Example 1:

Pixel image values corresponding to all locations within the logo mask are averaged, in order to form an image pixel value P. These locations are visible in the cutouts 1230 and 1220, and identifiable as the areas in which a logo shape has plainly been imposed on a first image frame. Examples of specific locations within a logo mask are shown, such as 1232, 1236, 1222 and 1226. The set of all locations within a logo mask is plainly visible as a logo comprising a filled triangle, and letters "H" "D" "T" and "V", within each cutout 1230 and 1220.

Pixel image values corresponding to all locations within the cutout but outside the logo mask are averaged, in order to form a background pixel value $\hat{P}_b$. Area 1233 within cutout 1230, and, area 1233 within cutout 1220, depict, by way of examples, some of such locations.

Case 1: Example 2:

Pixel image values corresponding to all locations within a specified region within the logo mask are averaged, in order to form an image pixel value P. In cutout 1230, such a region is depicted as 'inside mask' region 1236. In cutout 1220, such a region is depicted as 'inside mask' region 1226.

Pixel image values corresponding to all locations within a specified region outside the logo mask are averaged, in order to form a background pixel value $\hat{P}_b$. In cutout 1230, such a region is depicted as 'outside mask' region 1235. In cutout 1220, such a region is depicted as 'outside mask' region 1225.

The 'inside' and/or 'outside' regions of such an embodiment can be selected to be advantageously aligned with respect to geometric features of a known logo mask. For example, alignment with off-axis logo features can help to disambiguate between logo presence and on-axis features of background images. By way of example and not limitation, embodiments utilizing diagonally aligned 'inside mask' and 'outside mask' regions as depicted in diagram 4001 can be relatively insensitive to (mis)interpreting horizontal and/or vertical edge features within a background image as indicative of logo presence.

In some embodiments, the 'inside' and/or 'outside' regions of such an embodiment can be selected based on one or more additional or alternative criteria, such as, by way of example and not limitation, a set of pixels along the edges of the mask for the 'inside' region, a set of pixels outside the mask but near the edges of the mask for the 'outside' region, a random or pseudo-random pixel selector for the 'inside' and/or 'outside' portions, uniformity and/or brightness.

Blended Transition Detector:

Embodiments of a Blended Transition Detector (BTD) are herein described. A BTD can be responsive to boundaries between background pixels and overlay-blended pixels, and other boundaries that are consistent with a transition from non-blended pixels to blended pixels. That is, a BTD can respond to features of a combined image that are consistent with characteristics of overlay-blended graphics, such as logos, that are imposed within the image.

A BTD evaluates P(i,j) and $\hat{P}_b$(i,j)=P(i',j') for one or more pixel locations (i,j) in an image, where (i,j) denote the (row, column) of an image pixel. In some embodiments, the BTD can evaluate pixel locations within a specified region, a predetermined set of pixel locations, every kth pixel location, a majority of pixel locations, or even all pixel locations. The location of a spatially separate pixel (i',j') is spatially offset from the location of the image pixel by a specified value of $\delta$, in a specified direction D within the plane of the image.

The values of P(i,j) and $\hat{P}_b$(i,j) are employed to estimate the overlay-blended pixel value $\tilde{P}$(i,j), which can be according to Eqn. 3. The overlay-blended graphic presence criterion is evaluated, using these P, $P_b$, and $\tilde{P}$, which can be according to Eqn. 4. A overlay-blended graphic presence indicator $C_p$ can thereby be assigned a value for each location (i,j) within the plane of the image.

P(i,j) and $\hat{P}_b$(i,j)=P(i',j') can each be evaluated by various methods. For example, the pixel values at the locations (i,j) and (i',j') can be used directly. However, it may be preferable to use filtered pixel values at each position. Various filters for pixel values are known in the art and can be used with the present invention to determine filtered pixel values. One such filter can be referred to as a spatial averaging filter, which involves averaging the values of a set of preferably neighboring pixels. It can be advantageous to perform such spatial averaging in a direction essentially orthogonal to the specified direction D corresponding to a specific BTD. Notably, a variety of effective pixel filtering systems and methods are available, as are well-known in the related arts, such as by way of example and not limitation, filtering methods relating to image smoothing or to edge-detection in images. Note that a filtered value can also be referred to as a mean value or an average value, and locations (i,j) and (i',j') can also be considered to be from different areas of an image.

Figure 13:
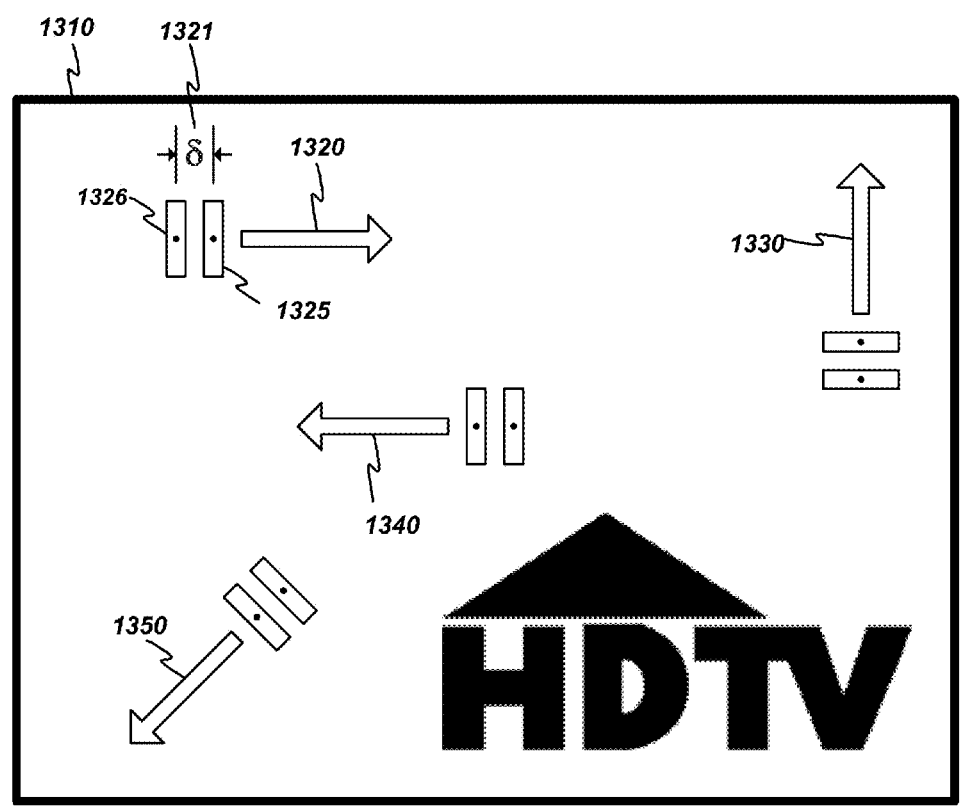
FIG. 13 shows an ROI to illustrate blended transition detector (BTD) operation.

FIG. 13 illustrates BTD operation. A BTD having a horizontal direction 1320 is shown within the image frame 1310. Region 1325 comprises a pixel location (i,j) and some additional pixel locations distributed equally on either side of location (i,j) and orthogonal to the direction of the BTD. Pixel value P(i,j) can be a filtered pixel value that is obtained by spatial averaging of the pixels in Region 1325. As an example and without limitation, region 1325 may include three pixels, having locations (i,j), (i−1,j), and (i+1,j) to provide spatial averaging in a direction essentially orthogonal to the specified direction 1320.

Region 1326 comprises the offset pixel location (i',j') and some additional pixel locations distributed equally on either side of location (i',j') and orthogonal to the direction of the BTD. The pixel location (i',j') within 1326 is located a specified distance $\delta$ 1321 from image pixel location (i,j) along the specified horizontal direction 1320 corresponding to this BTD. By way of non-limiting example, in some embodiments $\delta$ can have a small value, such as 2 pixels. Pixel value $\hat{P}_b$(i,j)=P(i',j') can be a filtered pixel value that is obtained by spatial averaging of the pixels in Region 1326.

The scan of all image locations, for a BTD embodiment having a direction as depicted by horizontal direction 1320 (left to right) can be described as: Let (i,j) denote the (row, column) of an image pixel. Scan over every pixel location in the image. For every pixel location let i'=i, and j'=j$\delta$.

The scan of all image locations for a BTD embodiment having a horizontal direction 740, which is opposite to the direction 1320, can be by characterized as letting i'=i, and j'=j+$\delta$.

In some embodiments, the BTD can use multiple values of the spatial offset delta. By using multiple values of delta, the BTD can identify additional blended-graphic pixels. As a non-limiting example, the BTD can operate with a first delta value to identify an outline of a blended-graphic, and then operate with additional delta values to "fill-in" the blended-graphic outline or provide a derived mask.

Examples of different directions corresponding to additional BTD embodiments are depicted in image frame 1310. In general, BTD direction is only limited as to be within the image plane. By way of example and not limitation, BTD embodiments having horizontal 1320 and 1340, vertical 1330, and diagonal 1350 directions are depicted. In the general case, for each available direction there exists a corresponding available opposite direction. In addition, a BTD is not limited to scanning over all (i,j) locations of an image, as a BTD can be applied to any one or more locations.

In some embodiments, mask boundaries and/or a more complete mask of the logo can be derived by selecting pixels that are known or discovered to be within the logo (by detection and/or any other known and/or convenient technique and/or method) and selectively modifying of the δ value until a non-positive result is obtained. By way of non-limiting example, upon detection of a positive indication of the presence of a logo, one or more anchor pixels can be established. A δ valve can then be incremented (or in some embodiments decremented) by a desired value and the result can be re-evaluated for presence of a positive indication of a logo. The δ value associated with the anchor pixel can be repeatedly incremented and the result re-evaluated for the presence of a positive indication of a logo. At the point that the incremented δ value yields a non-positive determination for logo presence, a subsequent anchor pixel can be selected and the process of incrementing (or decrementing) the δ value can be repeated in the same or a similar manner as described herein. This system, method and/or process can result in not only identification of the boundaries of the logo mask, but can also more completely define the interior of the logo mask and can assist in differentiating between solid and transparent graphics.

In some embodiments, the screen can be divided into regions for reduced complexity and reduced false results. By way of non-limiting example, if a user only desired search for logos in the lower right corner of a screen, a user could compute the detector outputs for the region of interest. Alternately, a user could evaluate previous frames and use the detector outputs from one or more previous frames to narrow the regions processed in a subsequent frame.

The disclosure contained herein is not intended to be limited to traditional logos, but can also be implemented with any known, convenient and/or desired graphic element.

Figure 14:
FIG. 14 shows an actual ROI in an image to further illustrate BTD operation.

FIG. 14 shows an actual ROI in an image to further illustrate BTD operation. The BTD having a horizontal direction 1420 is shown within the image frame 1410. The image provided is a representative example of at least a portion of a broadcast television image. Region 1425 comprises a pixel location (i,j) and some additional pixel locations distributed equally on either side of location (i,j) and orthogonal to the direction of the BTD. P(i,j) can be evaluated as a filtered pixel by spatial averaging of the pixels in Region 1425.

Region 1426 comprises the offset pixel location (i',j') and some additional pixel locations distributed equally on either side of location (i',j') and orthogonal to the direction of the BTD. The pixel location (i',j') within 1426 is located a specified distance δ 1421 from image pixel location (i,j) along the specified horizontal direction 1420 corresponding to this BTD. $\hat{P}_b(i,j)=P(i',j')$ can be evaluated as a filtered pixel by spatial averaging of the pixels in Region 1426.

A plurality of BTDs with distinct directions can operate on the same image. The corresponding results of the BTD operations, such as per-pixel results, can be combined. By way of example and not limitation, in some embodiments the results can be combined by evaluating a logical OR operation on a per-pixel basis, wherein the inputs to the OR operation are the per-pixel results from the BTDs, and the output can be a per-pixel combined result. In some embodiments, the combined result can provide an outline of graphics, such as logos, if the overlay-blended graphic is present in the image frame.

Figure 15:
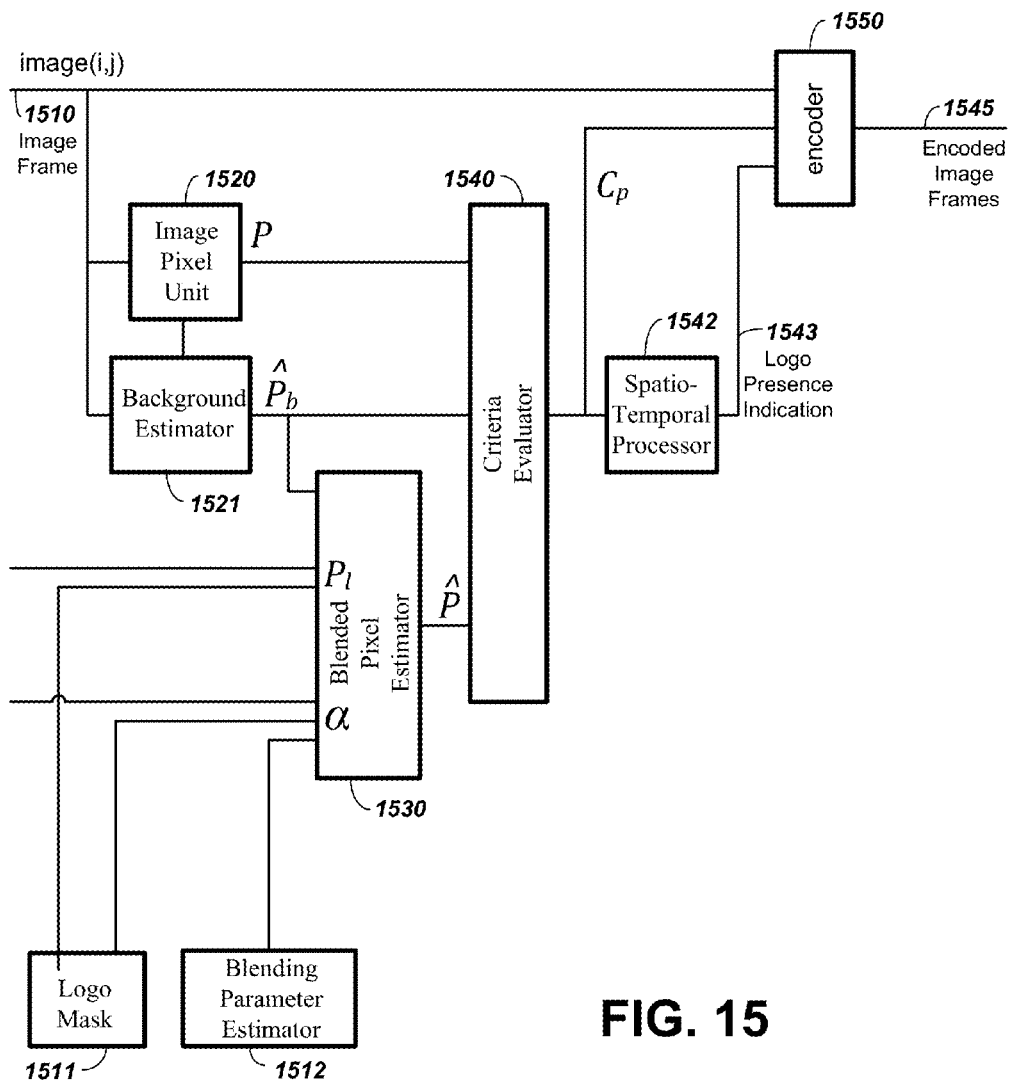
FIG. 15 depicts a block diagram of components used to provide an ROI detector.

FIG. 15 depicts a block diagram of components used to provide an ROI detector One or more image frames 1510 can be received by image pixel unit 1520. Image pixel unit 1520 can provide image pixel value(s) P, responsive to the image frames 1510 received. In some embodiments, image pixel unit 1520 processes received image frames 1510. Such processing can comprise, by way of non-limiting examples, spatial filtering, temporal filtering, and morphological functions.

One or more image frames 1510 can be received by background estimator 1521. Background estimator 1521 can provide estimated background pixel value(s) $\hat{P}_b$, responsive to the image frames 1510 received. In some embodiments, background estimator 1521 processes received image frames 1510. Such processing can comprise, by way of non-limiting example, spatial filtering.

Some embodiments can model a background pixel value of an alpha-blended pixel by a rearranged version of Eqn. 1:

$$P_h(i,j) = \frac{P(i,j) - \alpha P_l(i,j)}{1 - \alpha} \qquad \text{Eqn. 1(rearranged)}$$

Since this relationship provides the background pixel value that is at least partially obscured behind an overlay-blended graphic, it can be referred to as de-alpha-blending.

In some embodiments a pixel at (i,j) can be postulated to be within a blended graphic while a pixel at (i',j') can be postulated to be outside a blended graphic. Then the pixel at (i,j) can be de-alpha-blended and the result compared to the actual pixel value at (i',j'), If the value of the de-alpha-blended pixel at (i,j) is closer to the value of the pixel at (i',j') than the value of the pixel at (i,j), then the pixel at (i,j) can be identified as a overlay-blended pixel. In some embodiments, the identification can additionally be subject to satisfying a tolerance constraint, such as: the value of the de-alpha-blended pixel at (i,j) must be less than the pixel value at (i',j') plus a tolerance value, and/or the value of the de-alpha-blended pixel at (i,j) must be greater than the pixel value at (i',j') minus a tolerance value.

Some embodiments can use the way the background pixel value varies with the alpha-blended value to form predict a de-alpha-blended pixel value. From Eqn. 1, or Eqn. 3, it can be determined that as the value of the alpha-blended pixel increases or becomes brighter (along vertical axis 315), the difference between the background and blended pixel values decreases in a linear fashion. Also, it can be determined that the background pixel value is less than or equal to the blended pixel value. These characteristics can be used to form a predicted background pixel value for a pixel in one region from a pixel in another region.

In some embodiments a blending parameter estimator 1512 can estimate blending parameter value(s) α. In some embodiments, a logo mask 1511 is known. In some embodiments a logo mask 1511 can be explicitly specified. In some embodiments a logo mask can be derived from operations. In some embodiments, a logo mask can comprise one or more of location information, shape information, logo pixel value $P_l$ information, and/or blending parameter value α information.

Blended pixel estimator 1530 can receive estimated background pixel value(s) $\hat{P}_b$, logo pixel value(s) $P_l$, and blending parameter value(s) α. Blended pixel estimator 1530 can provide estimated blended pixel value(s) $\hat{P}$ responsive to the received $\hat{P}_b$, $P_l$, and α values. In some embodiments, $\hat{P}$ can be estimated according to Eqn. 3. In some embodiments, $\hat{P}$ can be estimated according to Eqn. 5a or Eqn. 5b.

Criterion evaluator 1540 can receive estimated background pixel value(s) $\hat{P}_b$, logo pixel value(s) $P_l$, and estimated blended pixel value(s) $\hat{P}$. Criterion evaluator 1540 can evaluate an overlay-blended graphic presence criterion to provide an indication of overlay-blended graphic presence, such as overlay-blended graphic presence indicator value(s) $C_p$, responsive to the received $\hat{P}_b$, $P_l$, and $\hat{P}$ values. In some embodiments, an overlay-blended graphic presence criterion is evaluated according to Eqn. 4. For cases where a predetermined logo mask is used as part of determining $C_p$, a positive value of $C_p$ may indicate the presence of the logo specified by the mask.

Spatio-temporal processor 1542 can receive an indication of overlay-blended graphic presence such as overlay-blended graphic presence indicator $C_p$. In some embodiments, spatio-temporal processor 1542 can receive $C_p$ along with its corresponding (i,j) position for each location in the image. In some embodiments, spatio-temporal processor 1542 provides temporal filtering and/or morphological operations as described herein in relation to particular embodiments. Spatio-temporal processor 1542 can thereby provide a processed indication of logo presence 943. For embodiments using one or more BTD(s), positive values of $C_p$ will typically occur along the edges of an overlay-blended logo. In some embodiments, the set of positive $C_p$ locations can then be further processed to determine whether a logo is present. As an example and without limitation, the positive $C_p$ locations can be represented in a binary image having the same dimensions as the image being analyzed, where non-positive $C_p$ locations are represented by a 0 and positive $C_p$ locations are represented by a 1. As an example and without limitation, morphological operations, such as a closing operation followed by an opening operation, can be applied to the binary image to eliminate noisy isolated positive responses and fill-in regions with several nearby positive responses, and the presence of such a filled-in region after morphological processing may indicate the presence of a logo or other graphics objects.

An encoder 1550 can receive an indication of overlay-blended graphic presence such as $C_p$, a processed indication of logo presence such as provided by a spatio-temporal processor 1542, and one or more image frames 1510. An encoder can provide encoded image frames 1545. A process of encoding received image frames 1510 can be responsive to an indication of overlay-blended graphic presence such as $C_p$, a processed indication of logo presence 1543 such as provided by a spatial-temporal processor 1542, and the received image frames 1510. As an example and without limitation, encoder 1550 may allocate more bits or a higher encoding quality target to a portion of the input image containing a group of overlay-blended pixels or a positive logo presence indication.

Figure 16:
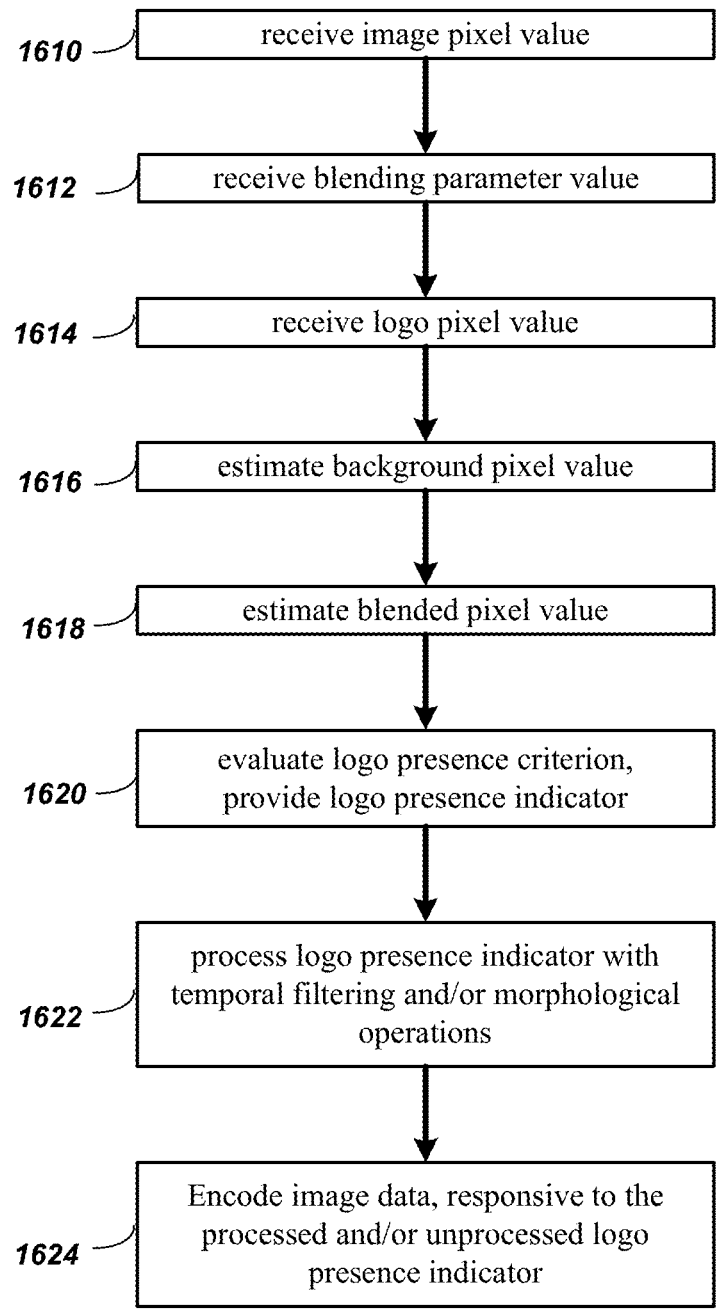
FIG. 16 depicts a flow chart illustrating operation of an ROI detector.

FIG. 16 depicts a flow chart illustrating operation of an ROI detector. In step 1610, image pixel values P can be received, such as those that comprise an image frame. In step 1612, blending parameter value(s) α can then be received. In step 1614, logo pixel value(s) $P_l$ can further be received.

Next pixel estimates are made. In step 1616, background pixel value(s) $P_b$ are be estimated, as $\hat{P}_b$. In step 1618, blended pixel value(s) P can be estimated, as $\overline{P}$. In step 1020, an overlay-blended graphic presence criterion can then be evaluated. In response to the evaluation, an overlay-blended graphic presence indicator, such as $C_p$, and a logo presence indication can be provided. In some embodiments, in step 1622, an overlay-blended graphic presence indicator, such as $C_p$, can be processed. The processing can comprise temporal filtering and/or morphological operations. In some embodiments, in step 1624, image data such as image pixel values received (above) can be encoded, thereby providing encoded image frames. The encoding can be responsive to an overlay-blended graphic presence indicator such as Cp and/or responsive to a processed logo presence indicator.

Figure 17A:
FIGS. 17a-17b depict an example input image and processed image.
Figure 17B:
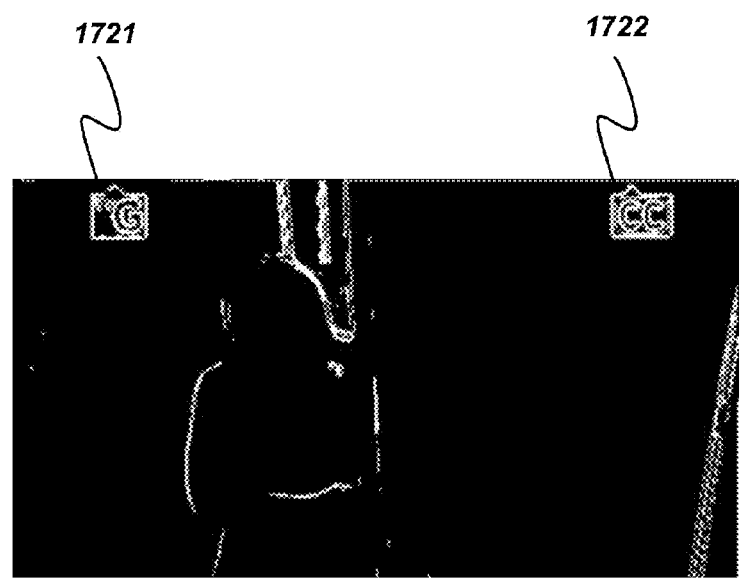

FIG. 17a depicts an example combined image and FIG. 17b represents a processed version of the image of FIG. 17a. The combined image includes overlay-blended graphics elements as identified at locations 1711 and 1712. The processed image of FIG. 17a displays the combined results of several BTD operations on the combined image of FIG. 17a. BTDs corresponding to (two) horizontal and (two) vertical directions operated on the combined image 10010. That is, the BTD directions comprised: left to right, right to left, top to bottom, and, bottom to top. The results of the BTD operations were combined with a logical OR operation as described herein. The processed image of FIG. 17b displays the per-pixel combined results. Notably, outlines of imposed graphic elements are visible at locations 1721 and 1722, corresponding respectively to the blended graphics at locations 1711 and 1712 within the combined image 1710.

In some embodiments, the results of BTD operations on an image, such as a combined image, may indicate transitions at some pixel locations that do not correspond to imposed graphics, such as logos. The results can be refined through the application of temporal filtering and/or morphological operations. In some embodiments, the temporal filtering and/or morphological operations can be advantageously applied to the image, such as the combined image, and/or to the results of the BTD operations, such as to the combined result of several BTD operations on an image.

Temporal filtering operations can comprise, by way of example and not limitation, time decimation of the frames of a source video image stream, and, an averaging filter applied to the time-decimated pixels. By way of example and not limitation, an input source stream having a frame rate of 30 frames per second can be decimated to 1 frame per second. The decimated frames of image pixels can then be averaged with a recursive single-pole filter, wherein the contribution of a current frame image pixel value contributes 10% to the average value of the image pixel value.

Morphological operations, as are well known in the image processing arts, can follow and/or otherwise be combined with temporal operations, such as the filtering operations described supra. Morphological operations can comprise, by way of example and not limitation, a closing operation, and/or an opening operation.

In some embodiments, a closing operation, followed by an opening operation, can be performed subsequent to decimation and filtering operations.

In some embodiments as depicted in FIG. 15, image pixel unit 1520 can apply time decimation and/or filtering to images and/or image streams 1510. In some embodiments as depicted in FIG. 15, spatio-temporal processor 1542 can provide morphological operations to the results of BTD and/or other processing upon image frames. In some embodiments, image pixel values, P, 1520 can be temporally averaged independently from estimated background pixel values, $\hat{P}_b$, 1521, which can be temporally averaged. However in alternate embodiments, image pixel values, P, 1520 can be collectively temporally averaged with estimated background pixel values, $\hat{P}_b$, 1521.

In some embodiments, a derived graphic/logo mask can be determined based on temporal averaging and/or thresholding of image data. When a graphic is determined to be persistently present over several video frames, temporal averaging of the frames to provide an averaged image can advantageously reduce the contribution of the non-graphic pixels to the averaged image. If the image data is based on luminance values, the luminance of graphic pixels in the averaged image can be higher than that of the non-graphic pixels. Thresholding the averaged image based on a luminance threshold can identify a derived graphic mask. That is, in some embodiments pixel locations having a luminance value above outside a threshold can be determined to be part of the derived graphic mask. The threshold value can be fixed or can be determined based on characteristics of the pixels, such as spatial average value of some of the pixels, deriving the threshold based on Otsu's method and/or based on any other known, convenient or desired characteristic and/or characteristics.

In some embodiments, an image cutout region can be predetermined based on knowledge of where blended-graphics can or are likely to be present, or can be determined by identifying a region that has positive BTD results over multiple (although not necessarily consecutive) frames. Temporal averaging and/or thresholding can then, in some embodiments, be limited to the image cutout region. In some embodiments, temporal averaging can be controlled by characteristics of the pixels such as the luminance of an image and/or image region can be spatially averaged and compared to a luminance threshold. In alternate embodiments any other known and/or convenient pixel characteristic and/or concatenated statistical pixel characteristic can be compared. If the threshold is not exceeded, the image can be excluded from the averaging process.

Figure 18A:
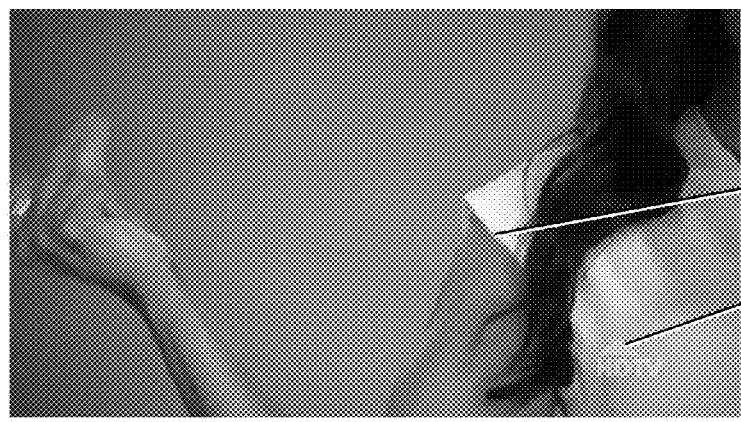
FIGS. 18a-18c depicts an example input image, a first processed image and a second further processed image using morphological processing.
Figure 18B:
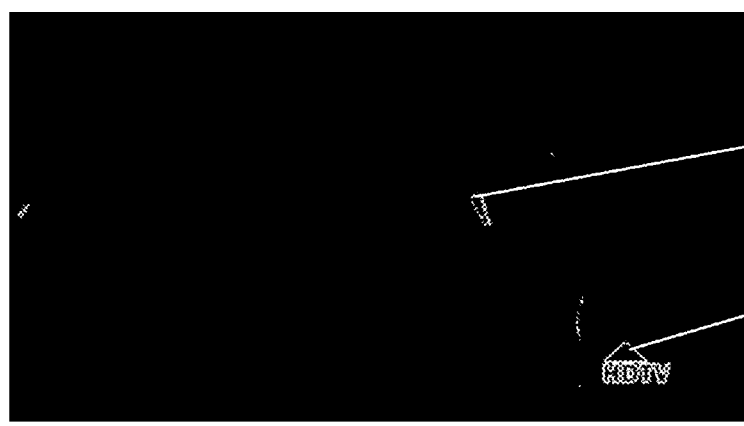
Figure 18C:

FIG. 18a depicts another example combined image 1810, while FIG. 18b shows a first processed image, and FIG. 18c shows a second processed image 1830. The combined image of FIG. 18a includes a graphic element as identified at location 1811. The combined image represents a current frame within a 30 frames-per-second stream of image frames.

The first processed image of FIG. 18b depicts the results of decimating and filtering the stream of source image frames, and application of BTD operations on the decimated and filtered current frame. The decimated and filtered current frame is not shown. The decimation and filtering is applied as described supra. It can be appreciated that the first processed image of FIG. 18b thereby depicts a current first processed image within a stream of first processed images resulting from the temporal operations on the stream of source image frames. The second processed image of FIG. 18c displays a current result of morphological operations on the stream of first processed images. The morphological operations are applied as described supra.

In FIGS. 18a-c, an imposed graphic element can be identified at location 1821 within the first processed image of FIG. 18b, and at location 1831 within the second processed image of FIG. 18c, corresponding respectively to the blended graphic at location 1811 within the combined image of FIG. 18a.

Notably, first processed image of FIG. 18b indicates transitions at some pixel locations 1822 that do not correspond to imposed graphics, such as logos, at the corresponding location 1812 within the source combined image of FIG. 18a. The second processed image of FIG. 18c does not indicate imposed graphics at location 1832, corresponding to the indication at location 1822 within first processed image of FIG. 18b. Thus the combined sequence of operations has successfully refined the results.

Combination of Case 1 and Case 2:

In some embodiments, Case 1 and Case 2 operations can be combined. Some such embodiments can support identification of graphics, such as a logo, presence on a frame-by-frame basis. The location and outline of a logo mask that is not identified can be obtained from Case 2 operations on a stream of images, as herein described. Such a logo mask can be described as a derived logo mask.

In some embodiments, the Case 2 operations can be applied over a large number of image frames from a stream of image frames. By way of example and not limitation, such operations can be applied to frames corresponding to a time duration of seconds, or minutes, upon an image stream having a frame rate of 30 frames per second.

In some embodiments, Case 1 operations can be applied on individual image frames from the stream of image frames, by employing the identified logo mask. Such operations can provide an indication of logo presence on a frame-by-frame basis. Notably, the Case 1 operations can be applied to individual image frames that have not been averaged with other frames from the stream of image frames.

In some embodiments, Case 2 operations can be applied on individual image frames from the stream of image frames. Results from these Case 2 operations on individual frames can be compared with the derived logo mask. The comparison can comprise a measure of similarity. By way of example and not limitation, such a measure can be compared against a specified threshold and the result can provide an indication of logo presence on a frame-by-frame basis.

In some embodiments, if the presence of and/or the logo is unknown at the commencement of processing, the systems, methods and/or apparatus described herein can be used to identify the presence, location and/or mask for a logo. After the mask and/or location for a logo is identified, the system, method and/or apparatus can use the mask for the identified logo to process using alternate systems, methods, techniques and/or apparatus that can be employed with known and/or identified masks. Accordingly, previously unknown and/or previously known logo masks can be defined and frame-by-frame processing of images can be processed based upon the defined mask and their presence within the image readily identified.

Embodiments of combined Case 1 and Case 2 operations can provide some notably advantageous features that can comprise, by way of example and not limitation: (1) Providing a frame-by-frame logo presence indicator, suitable for use by encoding processes. (2) Automatically generating a logo mask, thereby eliminating a need to provide the mask by other means such as explicit specification. (3) Adapting to changes in logo mask location within an image frame, and adapting to changes in the corresponding content, that is, the design, of a graphic element, such as a logo.

Solid Graphics:

In some embodiments, the identification of a graphic element that comprises a filled region, which can be described as a solid graphic, can be supported by refining the results of BTD operations through the application of temporal filtering and/or morphological operations. The results can be refined through the application of temporal filtering and/or morphological operations, as described supra.

Figure 19A:
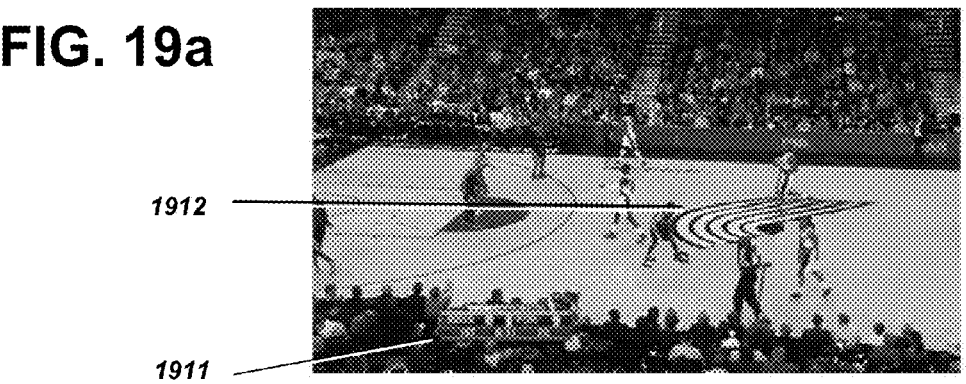
FIGS. 19a-19c depicts another example input image with a sports score and scoring, along with first and second processed images similar to FIGS. 18a-18c.
Figure 19B:
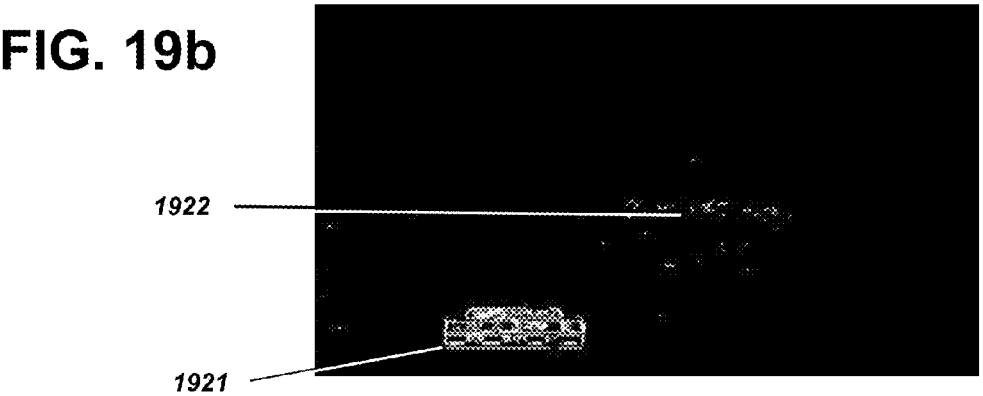
Figure 19C:
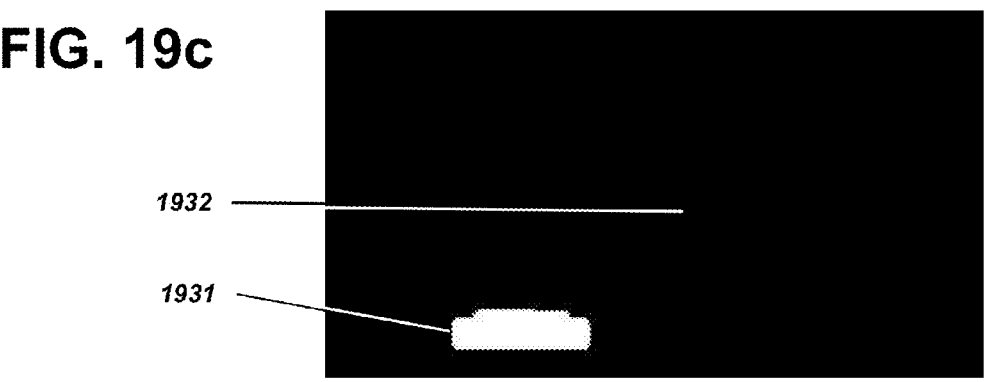

FIG. 19a depicts an example combined image of a sports game and scoring, while FIG. 19b shows a first processed image, and FIG. 19c shows a second processed image similar to FIGS. 18a-18c. The combined image of FIG. 19a includes a graphic element as identified at location 1911. The combined image represents a current frame within a 30 frames-per-second stream of image frames.

The first processed image of FIG. 19b depicts the results of decimating and filtering the stream of source image frames, and application of BTD operations on the decimated and filtered current frame. The decimated and filtered current frame is not shown. The decimation and filtering is applied as described supra. It can be appreciated that the first processed image of FIG. 19b thereby depicts a current first processed image within a stream of first processed images resulting from the temporal operations on the stream of source image frames.

The second processed image of FIG. 19c displays a current result of morphological operations on the stream of first processed images. The morphological operations are applied as described supra.

An imposed graphic element can be identified at location 1921 within the first processed image of FIG. 19b, and at location 1931 within the second processed image FIG. 19c, corresponding respectively to the blended graphic at locations 1911 within the combined image of FIG. 19a.

Notably, first processed image of FIG. 19b also indicates transitions at some pixel locations 1922 that do not correspond to imposed graphics, such as logos, at the corresponding location 1912 within the source combined image of FIG. 19a. The second processed image of FIG. 19b does not indicate imposed graphics at location 1932, corresponding to the indication at location 1922 within first processed image of FIG. 19b. Thus the combined sequence of operations has successfully refined the results. Further the combination of operations has identified the imposed graphic 1931 comprising a filled region, that is, a solid graphic.

Figure 20:
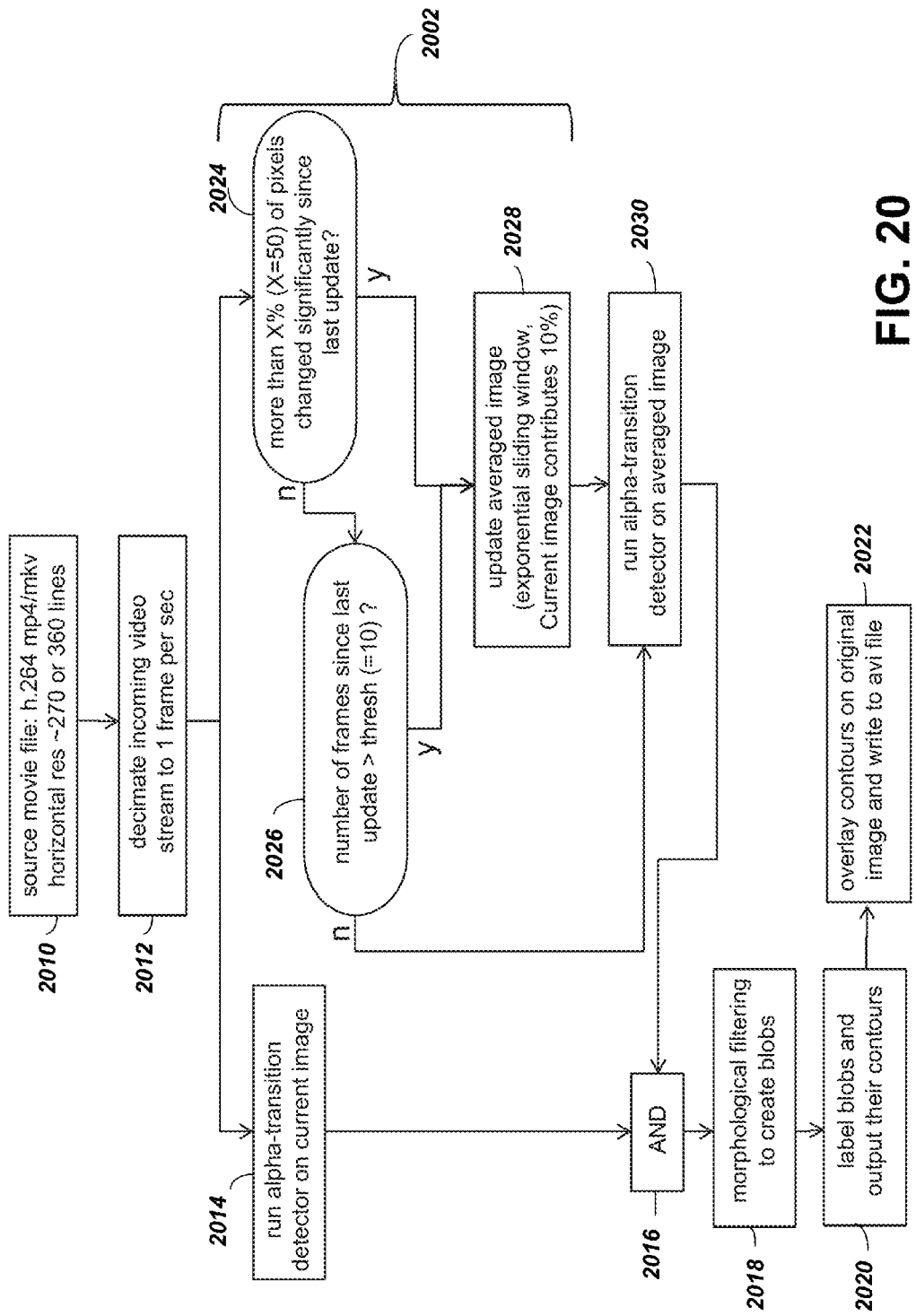
FIG. 20 depicts a detailed operation flow chart for ROI detector.

FIG. 20 depicts a detailed operation flow chart for ROI detector process. Such embodiments can utilize Case 2 BTD operations. The embodiments can identify spatial transitions from non-blended to blended pixels, within image frames. The embodiments can be responsive to imposed graphic elements such as semi-transparent logos and/or other forms of imposed graphics. The embodiments can be responsive to imposed graphics that are somewhat persistent, and can be so responsive for backgrounds that are static or somewhat dynamic. Absent an available logo mask, BTD and other operations in combination can apply temporal averaging to identify somewhat persistent graphics and to generate a region-of-interest mask. The embodiments can support frame-by-frame analysis to identify graphics presence in a current image frame. Such identification of graphics presence in a current frame can be filtered by a region-of-interest mask.

The operation begins in step 2010, with a source movie file comprising a stream of image frames that can be provided. By way of example and not limitation, the source movie file can have characteristics: h.264 mp4/mkv, horizontal res ~270 or 360 lines. In step 2012, the provided source stream can be decimated from a higher frame rate representation to a lower frame rate representation. In some embodiments, the lower frame rate representation comprises a stream of image frames corresponding to a frame rate of 1 frame per second.

In step 2014, in one path from operation 2012, BTD operations can be applied on a current image frame. In step 2016 the results of steps 2014 and 2030 can be logically combined with an AND operation. In step 2018, morphological filtering can be applied to the results of step 2016, thereby creating blobs. In step 2020, blobs received from step 2018 can be labeled, and contours of the blobs can be provided to subsequent processes. In step 2022, the provided contours of blobs can be overlaid on an original image frame, and the combined result can be written to a file, such as an avi file. This step does not need to be performed unless it is desired to create an archive or demonstration video of the results produced by the process.

In step 2024, in a second path from step 2012, a determination can be made that more than X% (X=50) of pixels in an averaged image frame have changed significantly since a previous update. If that determination is logically true, control flow can proceed to step 2028, otherwise control flow can proceed to step 2026. In step 2026 a determination can be made that the number of frames since a last update is greater than a specified threshold. In some embodiments, the threshold can be specified as 10. If the determination is logically true, control flow can proceed to step 2028, otherwise control flow can proceed to step 2030. In step 2028 an averaged image can be updated according to specified averaging characteristics. In some embodiments the characteristics can comprise: exponential sliding window, and, the current image contributes 10%. In step 2030 BTD operations can be applied on an averaged image frame.

A change-gated temporal averaging process 2002 comprises specific operations and control flow within the diagram 2001. The specific operations can comprise steps 2024, 2026 and 2028 and the specific flow control can comprise the herein described control flow corresponding to those steps.

Blending Parameter Value Estimation:

In some embodiments, the value(s) of blending parameter $\alpha$ can be estimated. Solving Eqn. 1 for $\alpha$ yields:

$$\alpha = \frac{P - P_b}{P_l - P_b} \quad \text{Eqn. 6}$$

An estimate of the blending parameter $\alpha\square \approx \alpha$ can be developed by providing values for P, $P_b$ and $P_l$ to a computation of Eqn. 6. Subsequent to the identification of an on-screen graphic mask, such as a logo mask, these values can be provided as described herein.

In some embodiments, the value of the alpha-blending parameter can be estimated. By way of non-limiting example, an image can be analyzed to determine if a graphic is present within a region specified by a mask (either predefined or derived). If so, the alpha value can be estimated based on Eqn. 6, with P provided by one or more pixels from the region and $P_b$ provided by one or more pixels outside the region. In some embodiments, the image used for estimating the alpha value can be a temporally averaged image.

The value(s) of P can be a function of the values of some image pixels located within the location of the mask, within an image. Thus P can be evaluated and a value provided, by methods herein described, such as by way of example and not limitation, spatial averaging over a selected region within the location of the mask, within the image.

The value(s) of $P_b$ can be a function of the values of some image pixels located outside the location of the mask, within an image. Thus $P_b$ can be evaluated and a value provided, by methods herein described, such as by way of example and not limitation, spatial averaging over a selected region outside the location of the mask, within the image.

The value(s) of $P_l$ can correspond to the pixel values of a graphic before the graphic is overlay-blended onto another image, such as a logo, pixels. In some embodiments, these values can be assumed to be at a maximum in the corresponding operating range.

In some embodiments, the estimated blending parameter value(s) $\alpha\square$ can be provided and/or used in place of an explicitly and/or otherwise provided blending parameter value(s) $\alpha$.

In the diagram of FIG. 20, a blending parameter estimator 2012 can provide estimated blending parameter value(s) $\alpha\square$, as described herein. Blended pixel estimator 2030 can receive and operate responsively to the $\alpha\square$ value, as it does/would for explicitly and/or otherwise provided blending parameter value(s) $\alpha$.

In some embodiments, after an on-screen graphic mask has been estimated/derived, the system can estimate the value of the blending parameter alpha by examining some pixels inside the mask and outside the mask and treating the pixels outside the mask as background pixels and those inside the mask as alpha-blended pixels, the system can estimate the value of alpha by rearranging the original alpha-blending equation as follows:

$$P = (1-\alpha)P_b + \alpha P_l$$
$$P - P_b = -\alpha P_b + \alpha P_l$$
$$\frac{P - P_b}{P_l - P_b} = \hat{\alpha}$$

Where P is a function of some pixels inside the mask, such as average intensity and/or any other known and/or desired pixel characteristic, Pb is a function of some pixels outside the mask, and Pl is the value of logo pixels prior to the alpha-blending process. In some embodiments Pl can be assumed to be white, or intensity of 255. However in alternate embodiments any known, convenient and/or desired property(ies) and/or characteristic(s) whether uniform or non-uniform can be used.

In some embodiments if the overall brightness and/or variation of the pixels in the bounding box and/or cutout region is low and/or below a prescribed threshold, then the identified pixels can be added to a temporal accumulator and subsequently evaluated. When a prescribed number of frames have been passed to the temporal accumulator and/or when an alternate prescribed threshold is reached, a logo mask can be generated from the data in the temporal accumulator. In some embodiments, the defined logo mask position can be used as a reference to reposition the original logo mask within the frame and/or within the bounding box and/or cutout region for future detection.

In some embodiments, the results, outputs, or determinations of the methods described herein can be used to influence the operations of video processing equipment that include video encoders and decoders. By way of non-limiting example, the encoder can determine its operating parameters so as to target a higher quality of encoded video output for regions indicated as containing overlaid graphics. Some embodiments can provide an estimated value of an alpha-blending parameter to the video processing equipment in the decoder. Some embodiments can provide an estimated or derived blended-graphic/logo mask to the video processing equipment.

The execution of the sequences of instructions required to practice the embodiments can be performed by a computer system that is included as part of a video system decoder, encoder or combination of both, or as a separate processor in the system. The system can include a memory for storing code to enable a processor to perform the methods described. Further, a wired or wireless connection can be included between an encoder and decoder to enable communication of both video data and control information including metadata.

Although the present system, method and apparatus has been described above with particularity, this was merely to teach one of ordinary skill in the art how to make and use the in system, method and/or apparatus. Many additional modifications will fall within the scope of the system, method and/or apparatus, as that scope is defined by the following claims.

What is claimed:

1. A method for video signal processing comprising:
identifying an overlay region of interest (ROI) in a frame of a video signal;
identify at least one of contrast, brightness, hue, saturation and pixel density as a quality improvement factor for increasing quality of the ROI relative to a remaining portion of the frame of the video signal; and
providing the quality improvement factor as metadata with the frame to a decoder to enable processing of the video signal containing the frame using the metadata,
wherein identifying an overlay region comprises:
defining, by the electronic device, first and second areas within an image of the frame of the video signal;
calculating, by the electronic device, an alpha-blended value of a mean color value of the second area with an overlay color value; and
if a mean color value of the first area is closer to the alpha-blended value than it is to the mean color value of the second area, then defining the overlay area comprising at least one pixel within the first area to be within the ROI,
wherein calculating an alpha-blended value comprises applying an a priori alpha value and an a priori overlay color value, and
wherein the step of calculating an alpha-blended value is performed according to the formula $\hat{P}(i,j)=(1-\alpha)\hat{P}_b(i,j)+\alpha P_l(i,j)$,
wherein: $\hat{P}(i,j)$ represents the calculated alpha-blended value
$\hat{P}_b(i,j)$ represents the mean image color value of the second area,
$P_l(i,j)$ represents the a-priori overlay color value, and
$\alpha$ represents the a-priori alpha value, and
wherein the step of identifying an overlay area is determined according to the formula $C_p=\text{If }(|\hat{P}(i,j)-P(i,j)|<|P(i,j)-\hat{P}_b(i,j)|)$
wherein: $P(i,j)$ represents the mean color value of the first area,
$\hat{P}_b(i,j)$ represents the mean color value of the second area,
$\hat{P}(i,j)$ represents the predicted mean color value of the first area, and
$C_p$ represents an overlay-blended graphic presence indicator.

2. The method of claim 1, wherein the ROI is at least one of: a network logo, a sports score, and text.

3. The method of claim 1, wherein the ROI is identified on a pixel-by-pixel basis.

4. The method of claim 1, further comprising comparing the ROI to a stored overlay mask for the ROI using the decoder to enable better matching of the ROI to the stored overlay mask.

5. A method for video signal processing comprising:
identifying an overlay region of interest (ROI) in a frame of a video signal;
identify at least one of contrast, brightness, hue, saturation and pixel density as a quality improvement factor for increasing quality of the ROI relative to a remaining portion of the frame of the video signal; and
providing the quality improvement factor as metadata with the frame to a decoder to enable processing of the video signal containing the frame using the metadata,
wherein identifying an overlay region comprises:
defining, by the electronic device, first and second areas within an image of the frame of the video signal;
calculating, by the electronic device, an alpha-blended value of a mean color value of the second area with an overlay color value; and
if a mean color value of the first area is closer to the alpha-blended value than it is to the mean color value of the second area, then defining the overlay area comprising at least one pixel within the first area to be within the ROI, and converting the ROI to black and white using the decoder when the alpha blended value is below a predetermined value.

* * * * *